United States Patent [19]
Gortsema et al.

[11] Patent Number: 5,979,118
[45] Date of Patent: Nov. 9, 1999

[54] EXPANDABLE AND CONTRACTIBLE WORK STATION

[75] Inventors: Steven C. Gortsema, Grandville, Mich.; Thomas B. Eich, San Jose, Calif.; David P. Churchill, Kalamazoo, Mich.; Charles A. Seiber, Atherton, Calif.; Frank Freidman, San Francisco, Calif.; Jonathan J. King, East Grand Rapids, Mich.; Douglas G. Lyon, Wayland, Mich.; Douglas B. MacDonald, Caledonia, Mich.

[73] Assignee: Steelcase Development Inc., Grand Rapids, Mich.

[21] Appl. No.: 08/870,773

[22] Filed: May 16, 1997

Related U.S. Application Data

[63] Continuation-in-part of application No. 08/701,664, Aug. 22, 1996.

[51] Int. Cl.⁶ ..................................................... E04B 2/74
[52] U.S. Cl. .............................. 52/36.1; 52/36.6; 52/239; 52/656.9; 52/36.5
[58] Field of Search ............................. 52/36.1, 32, 36.2, 52/36.5, 36.6, 27, 239, 271, 656.9; 108/50, 42, 48, 47, 147, 144; 312/194, 195, 223.6, 223.3, 223.2

[56] References Cited

U.S. PATENT DOCUMENTS

| | | |
|---|---|---|
| 1,349,710 | 8/1920 | Beeson . |
| 2,614,017 | 10/1952 | Mugnier . |
| 2,657,811 | 11/1953 | Isler ...................................... 52/656.9 |
| 2,661,990 | 12/1953 | Knuth . |
| 2,744,714 | 5/1956 | Parke ..................................... 248/245 |
| 2,988,413 | 6/1961 | Bergen . |
| 3,008,585 | 11/1961 | NcNeill . |
| 3,049,390 | 8/1962 | Wolfe . |
| 3,425,568 | 2/1969 | Albright . |
| 3,514,883 | 6/1970 | Albright . |
| 3,648,626 | 3/1972 | Schuster . |
| 3,765,344 | 10/1973 | Ferdinand et al. . |

(List continued on next page.)

OTHER PUBLICATIONS

Exhibit A discloses a freestanding partition system installed in a public location by Steelcase more than one year prior to filing the present application (4 pages).
Exhibit B discloses a prior art bracket arrangement installed in a public location by Steelcase more than one year prior to filing the present application (4 pages).
Exhibit A is a brochure entitled *Knoll—Hannah Desk System*, 18 pages, dated Oct. 1986.
Exhibit B is a brochure entitled *Knoll—Hannah Desk System*, 13 pages, undated but published in 1986.
Exhibit C is a publication entitled *Knoll–13 Hannah Desk System—Electrical Assembly Guide*, (12 pages), undated but published in 1986.
Exhibit D is a publication entitled *Knoll—Hannah Desk System—Assembly Guide*, 12 pages, undated but published in 1986.

*Primary Examiner*—Christopher T. Kent
*Assistant Examiner*—Phi Dieu Tran A
*Attorney, Agent, or Firm*—Price, Heneveld, Cooper, DeWitt & Litton

[57] ABSTRACT

An expandable/contractible furniture component is configured for attachment to a partition system to provide an adjustable structure adapted to adjust with the partition system as the partition system is adjusted to provide different office sizes. The furniture component includes a corner shelf attached to the partition system, and in-line shelves also attached to the partition system. The in-line shelves are telescopingly adjustable into the corner shelf so that the plan dimensions of the shelves are adjustable concurrently with the partition systems to provide storage surfaces and shelves that extend and completely fill at least one dimension of the office. An in-line telescoping straight shelf construction and a two-way telescoping corner shelf construction are also disclosed.

23 Claims, 29 Drawing Sheets

U.S. PATENT DOCUMENTS

| | | |
|---|---|---|
| 4,102,275 | 7/1978 | Spound et al. . |
| 4,279,453 | 7/1981 | Haas . |
| 4,365,854 | 12/1982 | Waller . |
| 4,559,877 | 12/1985 | Waibel . |
| 4,600,248 | 7/1986 | Pflieger . |
| 4,619,486 | 10/1986 | Hannah et al. . |
| 4,639,049 | 1/1987 | Frascaroli et al. . |
| 4,713,949 | 12/1987 | Wilcox . |
| 4,731,960 | 3/1988 | Sease . |
| 4,821,477 | 4/1989 | Rydqvist ................................. 52/239 |
| 4,883,330 | 11/1989 | Armstrong et al. . |
| 4,886,236 | 12/1989 | Randall ................................... 248/250 |
| 4,974,915 | 12/1990 | Bussard ................................... 312/236 |
| 5,005,925 | 4/1991 | Diehl . |
| 5,241,796 | 9/1993 | Hellwig ................................... 52/36.4 |
| 5,255,966 | 10/1993 | Newhouse et al. ..................... 312/107 |
| 5,309,686 | 5/1994 | Underwood et al. ....................... 52/29 |
| 5,394,658 | 3/1995 | Schreiner et al. ....................... 52/36.1 |
| 5,454,636 | 10/1995 | Taub . |
| 5,513,575 | 5/1996 | Slade . |
| 5,826,385 | 10/1998 | Dykstra et al. ........................ 52/220.7 |

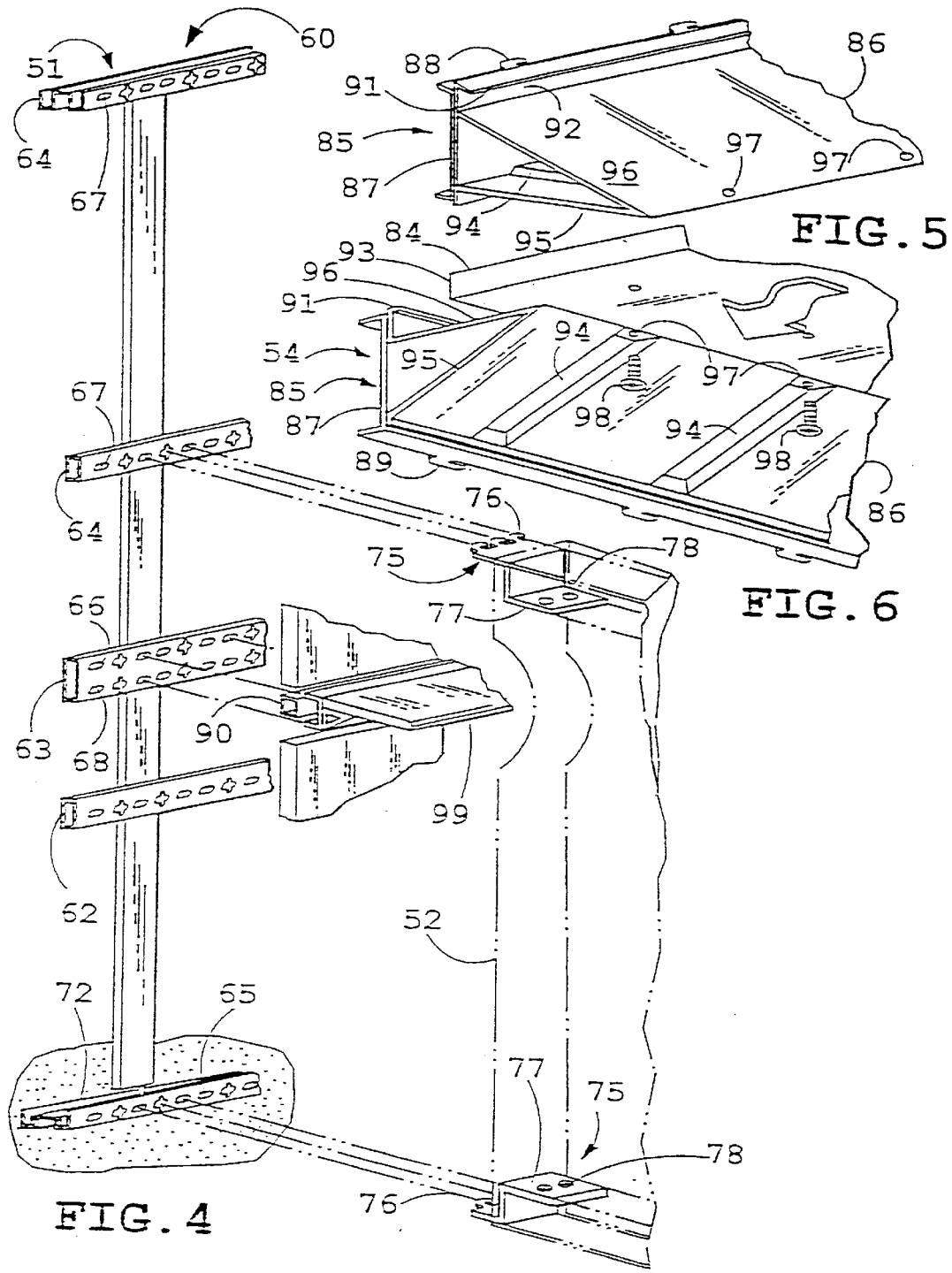

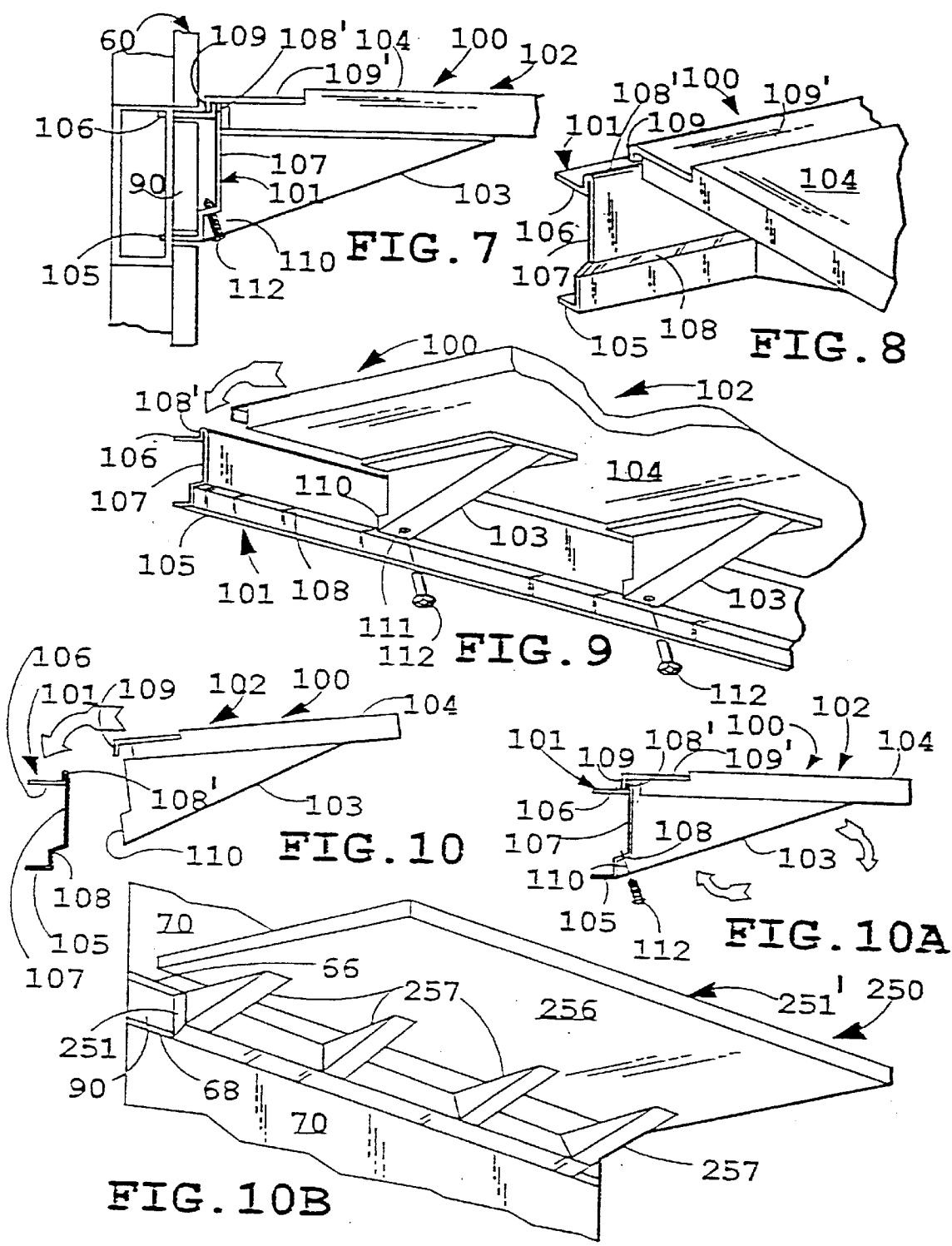

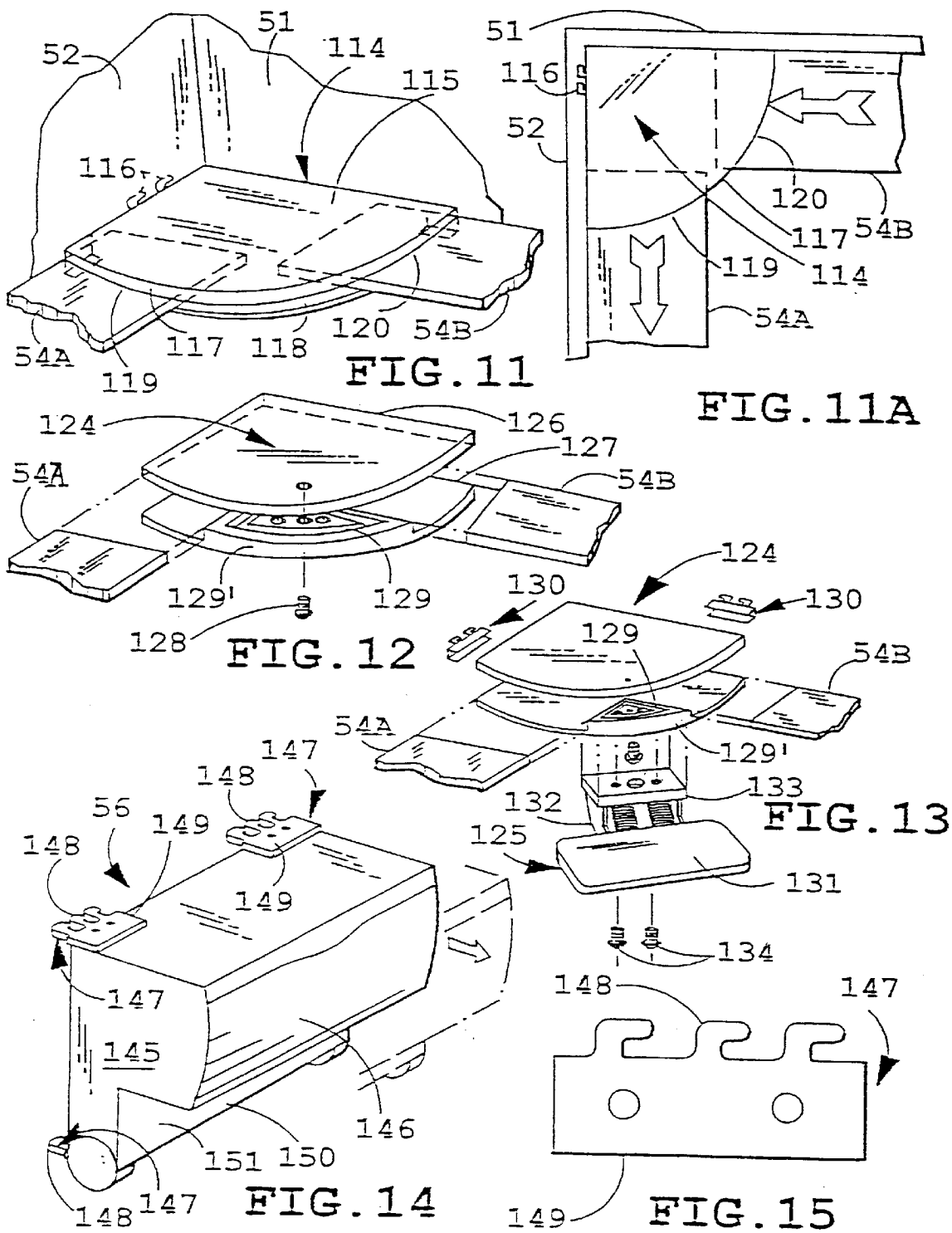

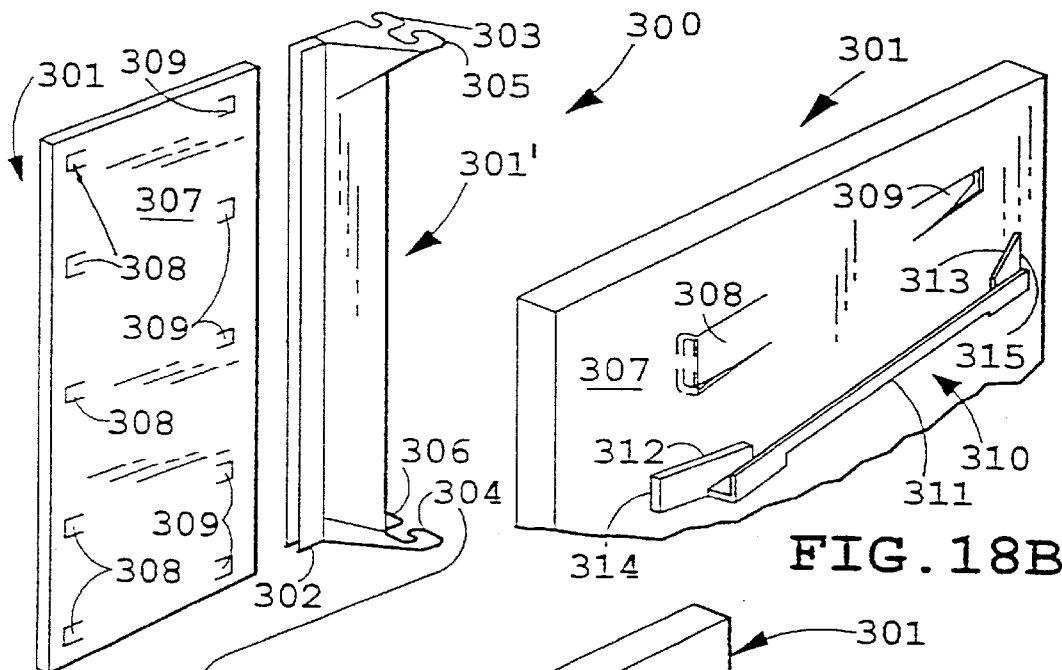
FIG. 18A
FIG. 18B
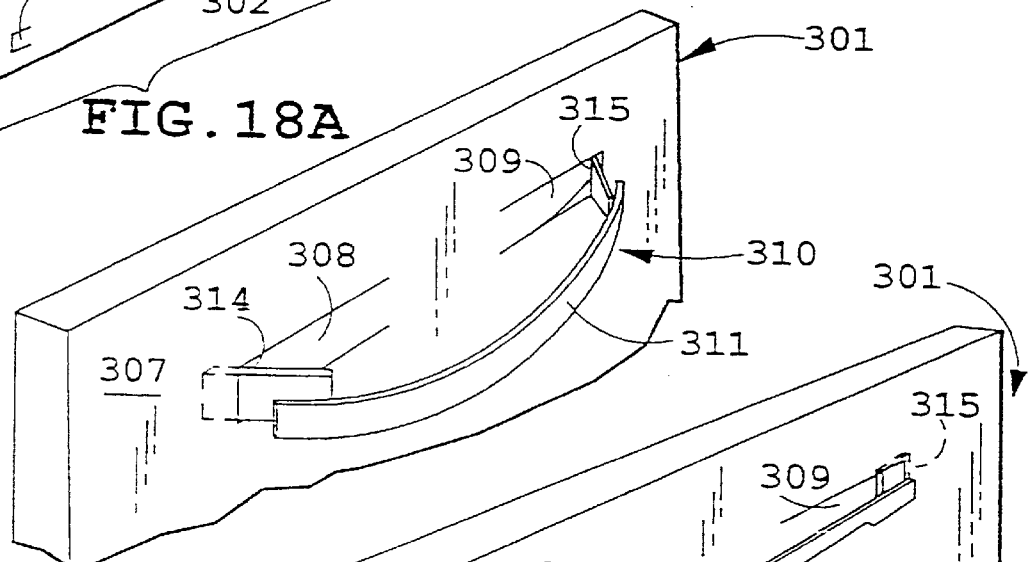
FIG. 18C
FIG. 18D

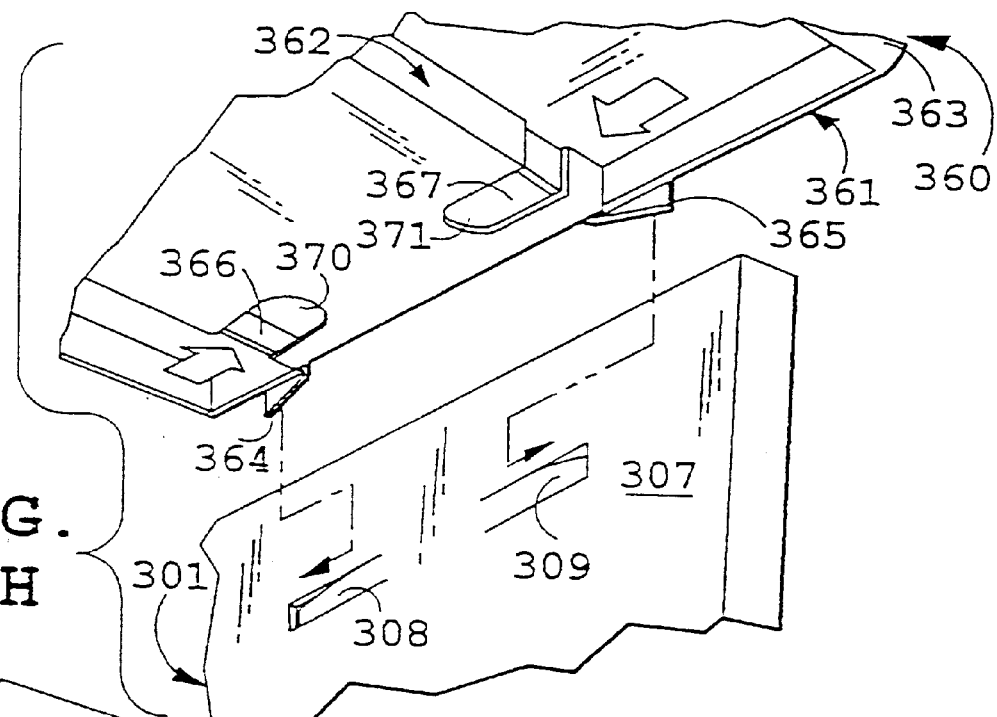
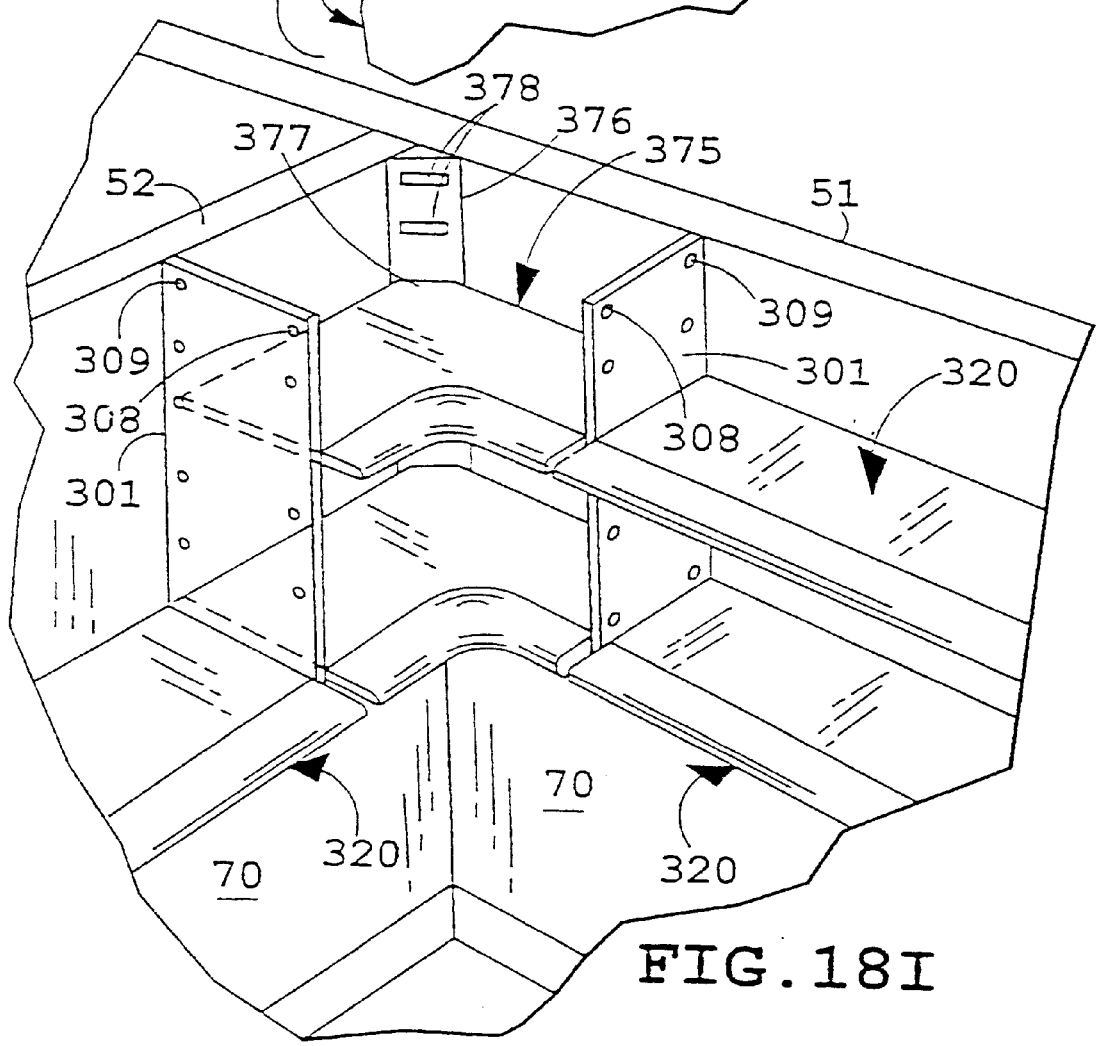

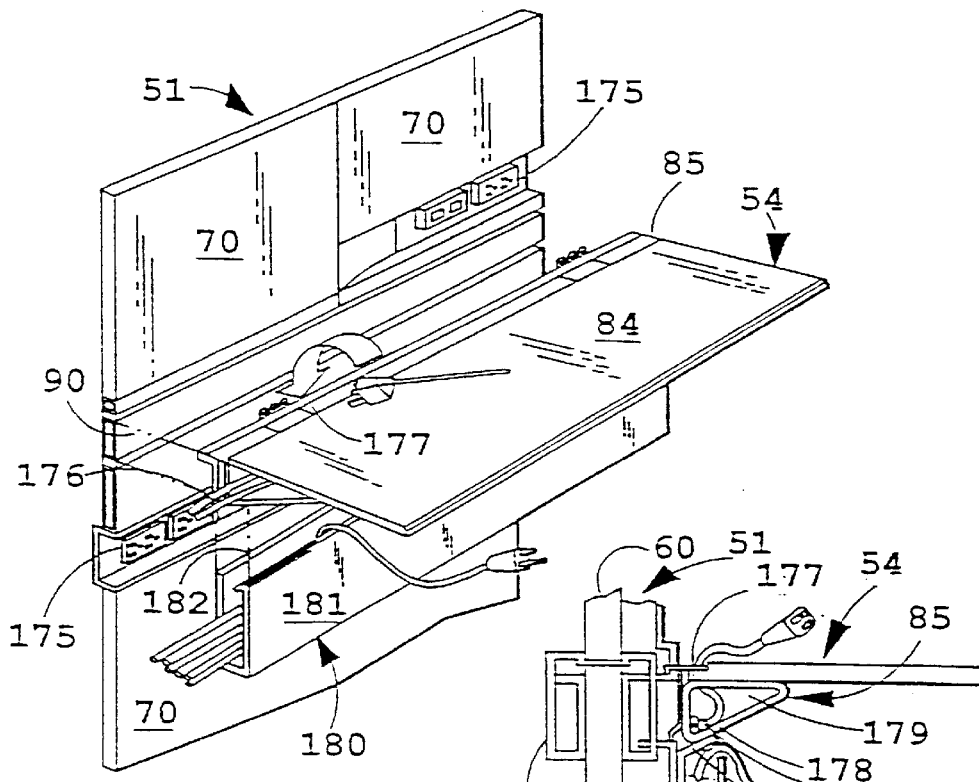
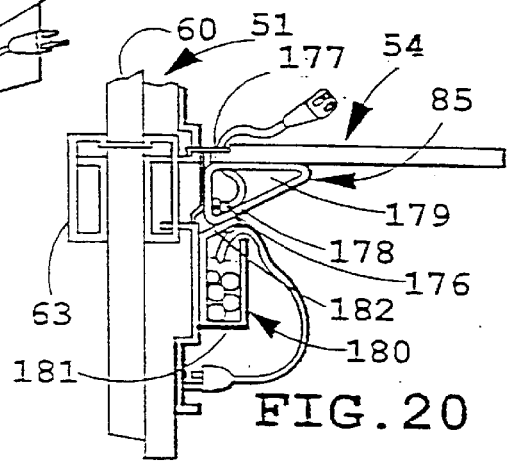
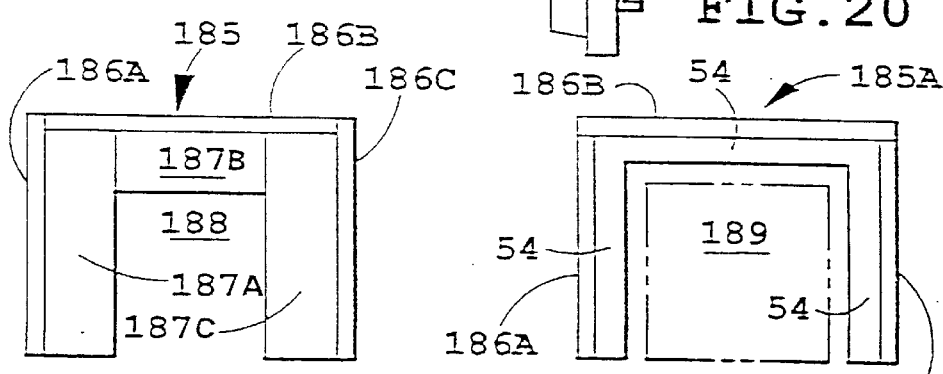
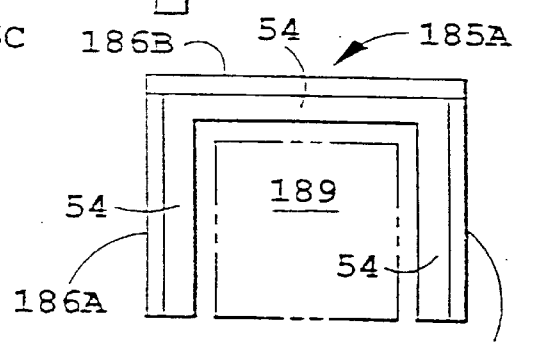
FIG. 19
FIG. 20
FIG. 21
PRIOR ART
FIG. 22

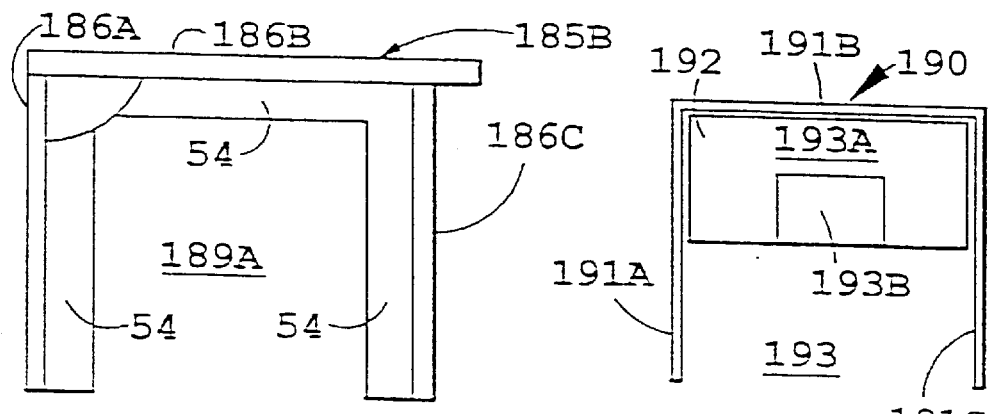
FIG.23
FIG.24
PRIOR ART
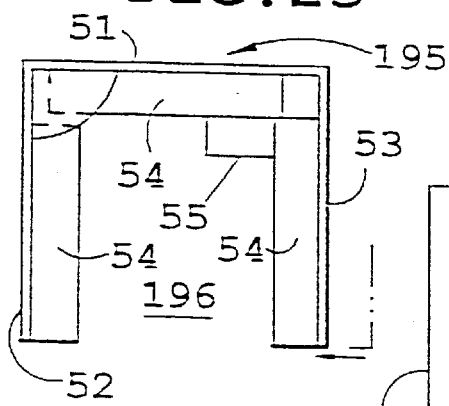
FIG.25
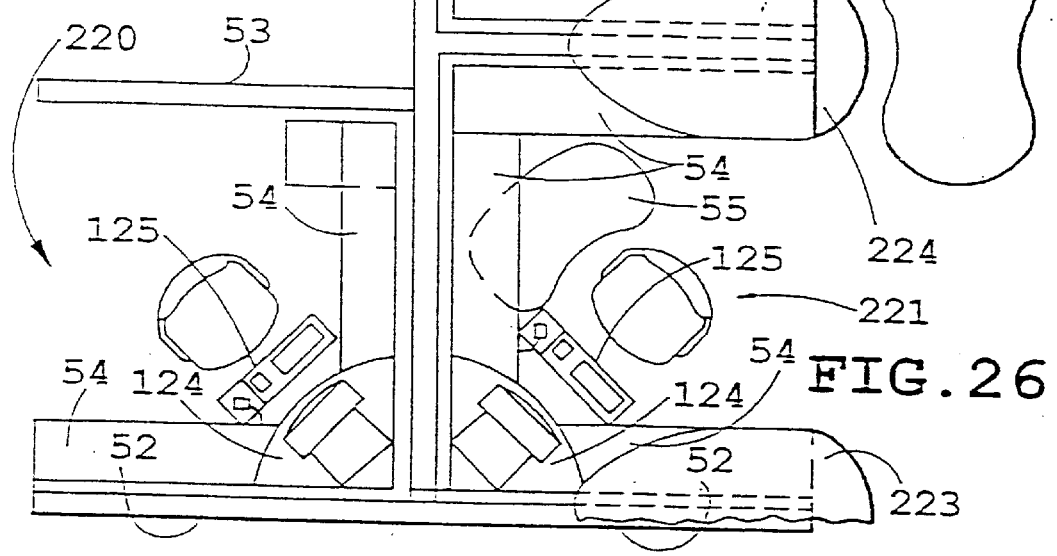
FIG.26

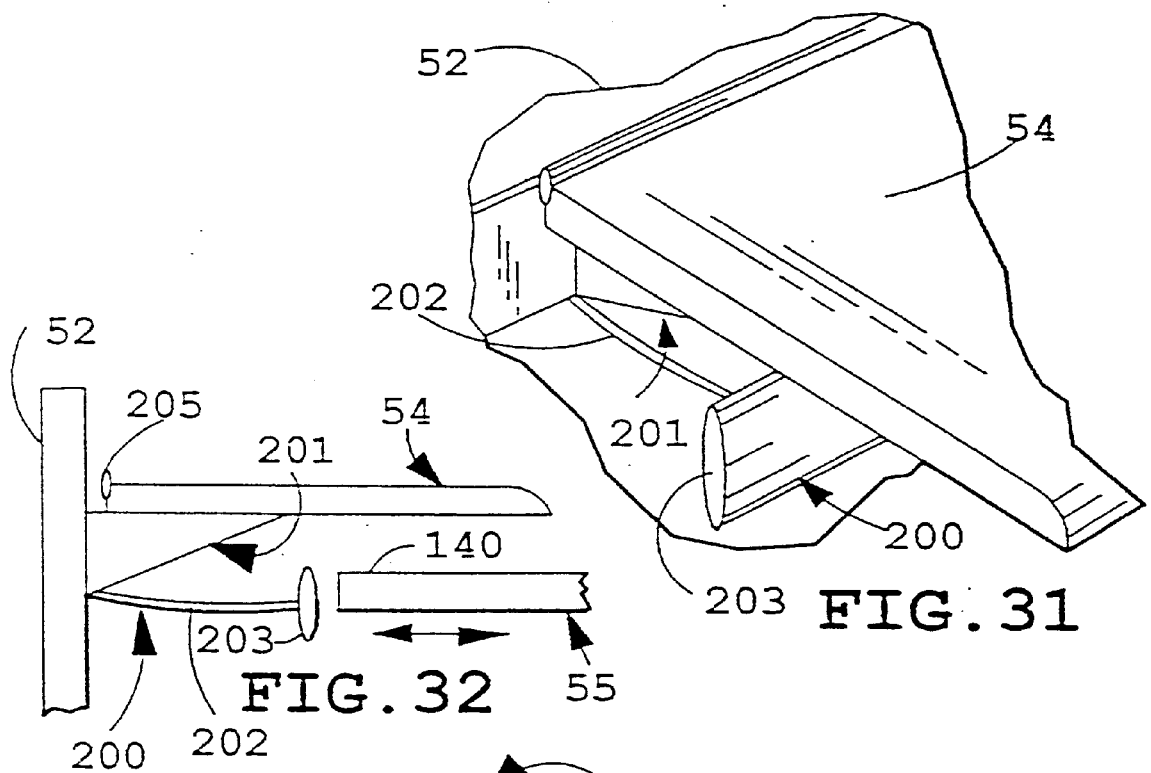
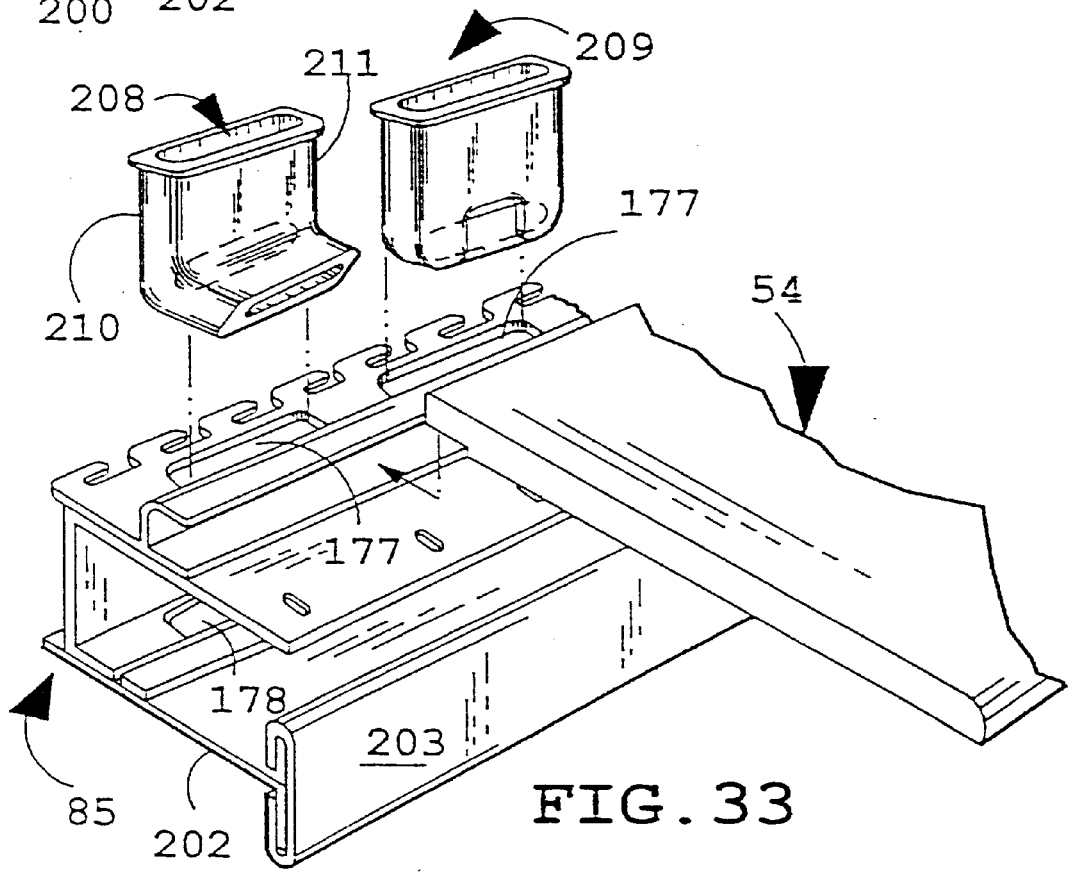

EXPANDABLE AND CONTRACTIBLE WORK STATION

CROSS REFERENCE TO RELATED APPLICATIONS

This is a continuation-in-part of application Ser. No. 08/701664, filed Aug. 22, 1996, entitled RECONFIGURABLE SYSTEM FOR SUBDIVIDING BUILDING SPACE AND HAVING MINIMAL FOOTPRINT.

BACKGROUND OF THE INVENTION

The present invention relates to expandable and contractible work stations, and in particular relates to a partition system including telescopingly expandable/contractible furnishings. A trend in modem offices and work environments is to reduce the size of individual offices and work areas, and to reduce the physical space that the apparatus forming the offices and work areas takes up (i. e. reduce their "footprint"). There can be many reasons to reduce the size of work areas, including increasing office density in order to reduce or control overall costs, to reduce individual workspace in order to free up space for group/team activities, and/or to provide office space or work space for additional employees. However, as office sizes are reduced, particularly as office sizes are reduced to a 6 feet by 6 feet area or less, spacial problems are encountered. Efficient use of storage space and work space becomes critical, as does user flexibility and control over organization of material and work flow. The work process must be designed to support natural and efficient storage of work papers in piles or folders, yet must allow the user to create context-specific work zones. One way of meeting this need is to provide custom-designed and custom-built furniture adapted for a particular use. But such custom furniture is not flexible and not reconfigurable, and thus is not satisfactory when an office or work area is reconfigured. Further, "old" furniture such as that used in the previous larger offices before the reconfiguration was done, either doesn't fit, or results in an oddly/inefficiently organized office having gaps around the furniture that are unusable or difficult to access. At the same time, it is not economically possible to offer customized furniture adapted to fit into each incrementally smaller size of office or work area, nor is it economically feasible to purchase new specially-sized furniture every time an office reconfiguration is done. Still further, the furniture construction should preferably provide for easy transition from personal to public workspace, but in a way making it easy to keep the office or workspace clean and neat, which presently known furniture often cannot do.

Traditional office furniture systems and also many "modern" office systems include a large worksurface, often 30 inches to 36 inches deep for example. While a large worksurface allows the user to spread papers around, we have discovered that this large worksurface is not nearly as efficient as has been historically assumed. A reason is because a typical office worker only utilizes about 3 square feet (i.e. about 1 foot 6 inches by 2 feet) in the center and front of the worksurface as a work area, and utilizes the remaining perimeter area (which can be 10 to 15 square feet in a 6 foot wide desk, for example) for storage of papers or other materials. The 10 to 15 square feet of storage area is difficult to reach or at least not easily reachable. Further, all of the storage is horizontal, thus taking up valuable floor space, even though the stored papers and other materials may be used only for particular tasks and not all tasks. Often smaller desks are forced onto workers, the thought being that the smaller desks have all of the workspace needed for the workers and also have drawers for storage. However, the smaller desks do not have sufficient workspace for tasks that require multiple papers to be spread out, particularly if other items are also on the desk. Further, the drawers limit knee space, making the office restrictive, and forcing a worker to work only from a center of the desk. Lighting can also be a significant problem, since small offices result in dark shadowy areas with limited room for chair movement and with limited visual access to files stored in low areas.

A particularly difficult and illusive problem with small offices is a feeling of crampedness and lack of room, and the related poor moral of workers who have to use such small offices. Many small offices, particularly offices of 6 feet by 6 feet and smaller, are noticeably tight and difficult to maneuver in, such that workers prefer not to spend time in them. Further, existing furniture can undesirably limit the workers' ability to customize or specialize their office to satisfy the need of a natural work flow. These problems are exacerbated by many factors, including office arrangements that physically partially enclose or trap the worker in the office, office arrangements that provide poor visual or physical access to storage areas, furniture that is not multifunctional and/or not flexible or reconfigurable for optimal efficiency and natural work flow, and in particular a work arrangement that does not provide an efficient workspace-to-storage-space logic.

Adjustability of shelving and worksurfaces in modern offices and work areas, particularly offices associated with paper-intensive tasks, is very important since it allows the office to be arranged for maximum efficiency. However, known shelves and worksurfaces adapted for hanging on partition systems are undesirably limited in their ability to be both horizontally and vertically adjusted, and further are incapable of expanding or contracting to satisfy constantly changing office needs and to fill constantly changing office dimensions. Another problem results where the partition system includes "fin wall" partitions that are connected at different perpendicular positions along a main run of "spine wall" partitions, including off-module positions located between the vertical side edges of the spine-wall partitions, to form offices having non-uniform dimensions. A problem is that furniture components hung on the "spine wall" partitions must not interfere with attachment of the "fin wall" partitions. But many times the limited available attachment locations on the spine-wall partitions drive the location of the furniture components, instead of a user being able to locate the furniture components in an optimal location. Further, even if a reasonably good attachment location is found, the non-expandability of the furniture components results in gaps between the furniture components and the "fin wall" partitions, or the non-contractibility results in furniture that simply will not fit in a reconfigured/smaller office.

Accordingly, a furniture construction solving the aforementioned problems is desired.

SUMMARY OF THE INVENTION

In one aspect, the present invention includes an apparatus for subdividing a building space having a partition with a frame. A first furniture component is attached to the frame including a horizontally facing end. A second furniture component is releasably attached to the frame and is configured for horizontal adjustment on the frame. The second furniture component includes a matingly shaped end telescopingly engaging the end of the first furniture component, whereby a total horizontal length of the first and second components can be selectively adjusted on the partition on-site.

These and other features and advantages of the present invention will be further understood and appreciated by those skilled in the art by reference to the following specification, claims, and appended drawings.

DESCRIPTION OF DRAWINGS

FIG. 4 is an exploded perspective view of a portion of the office construction shown in FIG. 1 including the partition frame, a portion of several cover panels attached thereto, and the desk-high datum shelf;

FIG. 5 is a fragmentary top perspective view and FIG. 6 is a fragmentary bottom perspective view of the shelf bracket shown in FIG. 4;

FIG. 7 is a fragmentary side cross sectional view of a modified active-use datum shelf attached to the partition panel shown in FIG. 2;

FIG. 8 is a top exploded fragmentary perspective view of the datum shelf shown in FIG. 7;

FIG. 9 is a bottom exploded fragmentary perspective view of the datum shelf shown in FIG. 8;

FIGS. 10 and 10A are schematic views showing assembly of the first modified datum shelf of FIG. 8 showing attachment to the partition panel;

FIGS. 10B–10G are perspective views of additional embodiments of datum shelves;

FIG. 11 is a fragmentary top perspective view of the corner datum shelf and surrounding structure as shown in FIG. 1;

FIG. 11A is a fragmentary plan view of the corner shelf and surrounding structure shown in FIG. 11;

FIG. 12 is a fragmentary top perspective view of a modified corner shelf including surrounding structure;

FIG. 13 is an exploded top perspective view of the modified corner shelf shown in FIG. 12;

FIG. 14 is a perspective view of the under shelf storage unit shown in FIG. 1, and FIG. 15 is a plan view of the under shelf storage unit attachment bracket;

FIGS. 18A–18I are perspective views of additional embodiments of upper storage shelves;

FIG. 19 is a perspective view of the panel shown in FIG. 1 including the datum shelf and the integrated wire management system thereof exploded away and showing wire routing;

FIG. 20 is a cross sectional view of the area behind the datum shelf shown in FIG. 2 including routing of wires;

FIG. 21 is a plan view of a typical 7½ feet by 7½ feet office area furnished with traditional furniture;

FIG. 22 is a plan view of a 7½ feet by 7½ feet office area including the present office furniture components shown in FIG. 1;

FIG. 23 is a plan view of an office area comparable to FIG. 22 but with the office area reduced to an area of 7½ feet by 6¾ feet office area;

FIG. 24 is a plan view of a 6 feet by 6 feet office area including a full size traditional desk positioned therein;

FIG. 25 is a plan view of a 6 feet by 6 feet office area including the furniture components shown in FIG. 1;

FIG. 26 is a plan view of a cluster of three offices, each configured into a different arrangement utilizing the same office furniture components shown in FIG. 1;

FIGS. 31 and 32 are a fragmentary perspective views of a second modified shelf bracket attached to a partition panel, the second modified shelf bracket including a worksurface high bumper for bumping away the portable table shown in FIG. 1;

FIG. 33 is an exploded view of the second modified shelf bracket shown in FIG. 32, including two different wire management sleeves;

DETAILED DESCRIPTION OF PREFERRED EMBODIMENT

Figure 1:
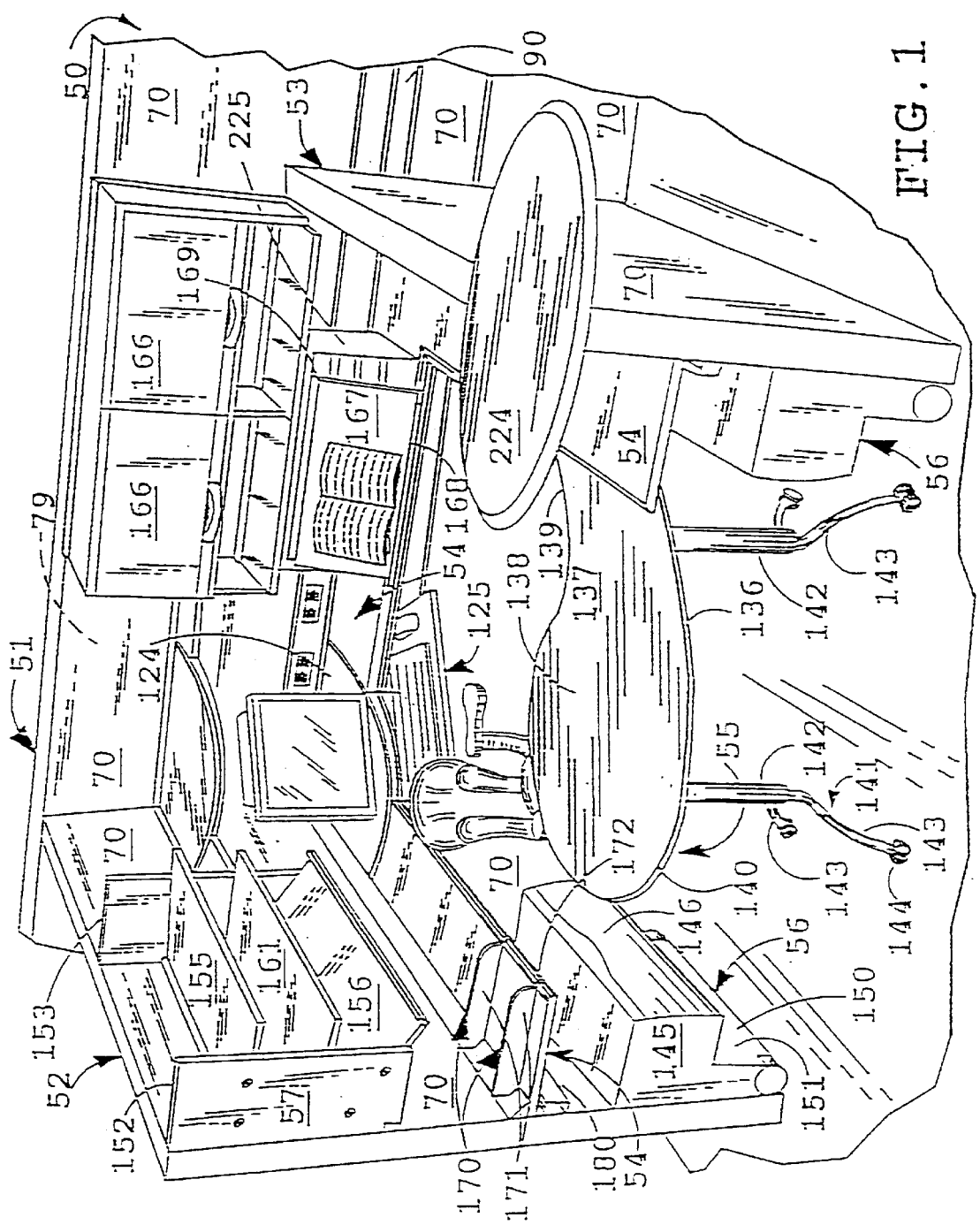
FIG. 1 is a perspective of an office construction embodying the present invention, including partition panels arranged in a U-shaped arrangement, a desk-high high-use datum shelf attached to the panels, a worksurface for cooperating with the shelf, an under shelf lower storage unit and an over shelf upper storage unit.

For purposes of description herein, the terms "upper", "lower", "right", "left", "rear", "front", "vertical", "horizontal", and derivatives thereof shall relate to the invention as oriented in FIG. 1 with the front of the shelves being adjacent a person seated in the office near the shelves. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

An apparatus 50 (FIG. 1) embodying the present invention includes three office partition panels 51–53 arranged in a U-shaped arrangement. The panels 51–53 each include frames having a plurality of horizontal frame members (described below) located at predetermined heights and having at least one horizontal row of slots. Furniture components are attachable to the horizontal frame members at selected horizontal positions, including a worksurface-coordinated desk-high actively-used datum shelf 54 configured to cooperate with a mobile furniture desking unit or table 55, a lower storage unit 56, and an upper storage unit 57. The term "datum shelf" as used herein is intended to refer to a shelf located at a predetermined height relative to a worksurface height so that items on the shelf are readily accessible and easily reached by a person working on and at a worksurface without unnecessary or awkward reaching or stretching by the person. The furniture construction 50 is constructed to maximize floor space and storage within an office area while maintaining a minimum footprint. Further, this is accomplished in a way that allows user reconfiguration, and that provides for maximum work efficiency and adaptability. The office arrangement further allows maximum visibility to all storage locations. Also, the office construction is surprisingly and unexpectedly open and spacious, even where the actual office footprint is less than traditional office sizes, such as office sizes equal to or less than 6 feet by 6 feet.

A panel construction of the type including panels 51–53 is fully described in coassigned copending U.S. application Ser. No. 08/687724, filed Jul. 26, 1996, entitled PARTITION CONSTRUCTION INCLUDING INTERCONNECTION SYSTEM AND REMOVABLE COVERS, and also in coassigned copending U.S. application Ser. No. 08/579,614, filed Dec. 26, 1995, entitled PARTITION SYSTEM, the entire contents of both of which are incorporated herein in their entireties by reference. Though the preferred panels are described in these applications and also below, it is contemplated that the present invention includes other types of partition panels and systems for subdividing building space into work areas.

Figure 3:
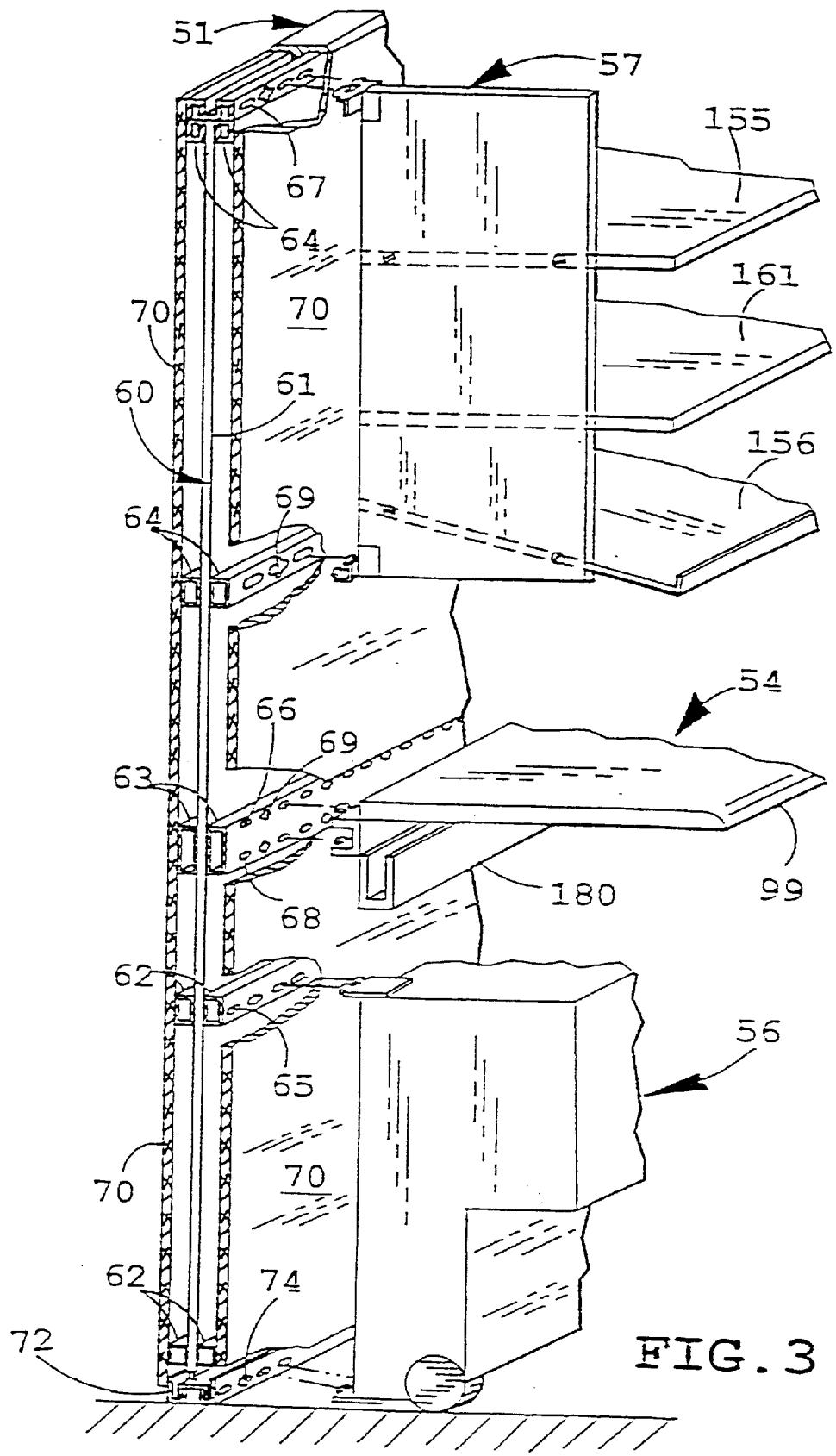
FIG. 3 is an exploded perspective view, partially broken away, of the left partition panel shown in FIG. 1.

In FIG. 1, panel 51 forms a rear part of the office 50 formed by panels 51–53, and is part of a "spine" formed by a plurality of the panels interconnected in-line with each other. It is contemplated that panel 51 will typically be adapted to carry utilities, such as the 4 inches thick zone wall partition panel shown in FIG. 3. Panel 51 (FIG. 3) includes an internal prewelded/rigid frame 60 having a pair of tubular uprights 61, and a plurality of tubular horizontal frame members including one or more pairs of front and rear floor-level horizontal frame members 62, front and rear intermediate desk-high horizontal frame members 63, and one or more pairs of upper horizontal frame members 64. The desk-high horizontal frame members 63 are located at a strategic vertical height above the floor, such as at about 28 inches to 30 inches (measured to their centerline), in order to locate datum shelf 54 at the height desired, as described below. Each horizontal frame member 62–64 includes a respective horizontal row of slots 65–67, with the exception that desk-high horizontal frame members 63 have an increased vertical dimension of about 3 inches and have both an upper row of slots 66 and a lower row of slots 68. The rows of slots 65–68 can have any unitary spacing desired, but in a preferred form are spaced about 1 inch apart. Also, several of the slots 65–68 are enlarged on one or both sides to a "T" shaped or "+" shaped configuration 69 for providing a space separate from the elongated slots to provide attachment of skins/cover panels 70 to the frames 60 for covering the frames. The skins 70 include connectors for mateably engaging the configured apertures 69 in a manner that leaves the slots of the apertures 69 unobstructed, and further that leaves a gap between adjacent skins 70 so that the slots 65–68 are continuously accessible between adjacent skins 70. A flap or "worm" 71 is included along an upper edge of each skin 70 to visually close the gap between skins 70, but the flap 71 is flexible so that it resiliently bends out of the way when access to the slots is desired. A floor channel 72 is configured to engage a leveler 73 on panel frame 60 and operably stably support frame 60. Floor channel 72 also includes a row of slots 74 comparable to slots 65–69.

Panels 52 and 53 (FIG. 1) are "fin" panels attached to spine panel 51 by off-module brackets 75 (see FIG. 4). Panels 52 and 53 (FIG. 1) can includes frames identical to panel 51, or alternatively can include thinner frames, such as non-utility-carrying frames of 2 inch total thickness. (See application Ser. No. 08/579,614 previously incorporated by reference.) Optimally, the same skins 70 can be used on panels 52 and 53. Off-module bracket 75 includes hooks 76 configured to securely engage slots 65–69 in a selected location, and further includes an arm portion 77 that extends from hooks 76 through the thin gap between skins 70. The end of bracket 75 opposite the hooks 76 includes an aperture 78 engageable by a fastener or connector on the end of panel 52 (or 53). Panel 52 (or 53) is secured to spine panel 51 by engaging at least two brackets 75 in selected ones of slots 65 and 67 in horizontal frame members 62 and 64 of spine panel frame 60. Additional brackets 75 can be used if desired. Panel 52 (or 53) includes an internal frame 79 (not unlike frame 60) having spaced apart vertical uprights, and horizontal frame members generally aligned with the horizontal frame members on spine panel frame 60. In particular, frame 79 includes an intermediate horizontal frame member having slots therein generally identical to slots 65 and 67.

Figure 2:
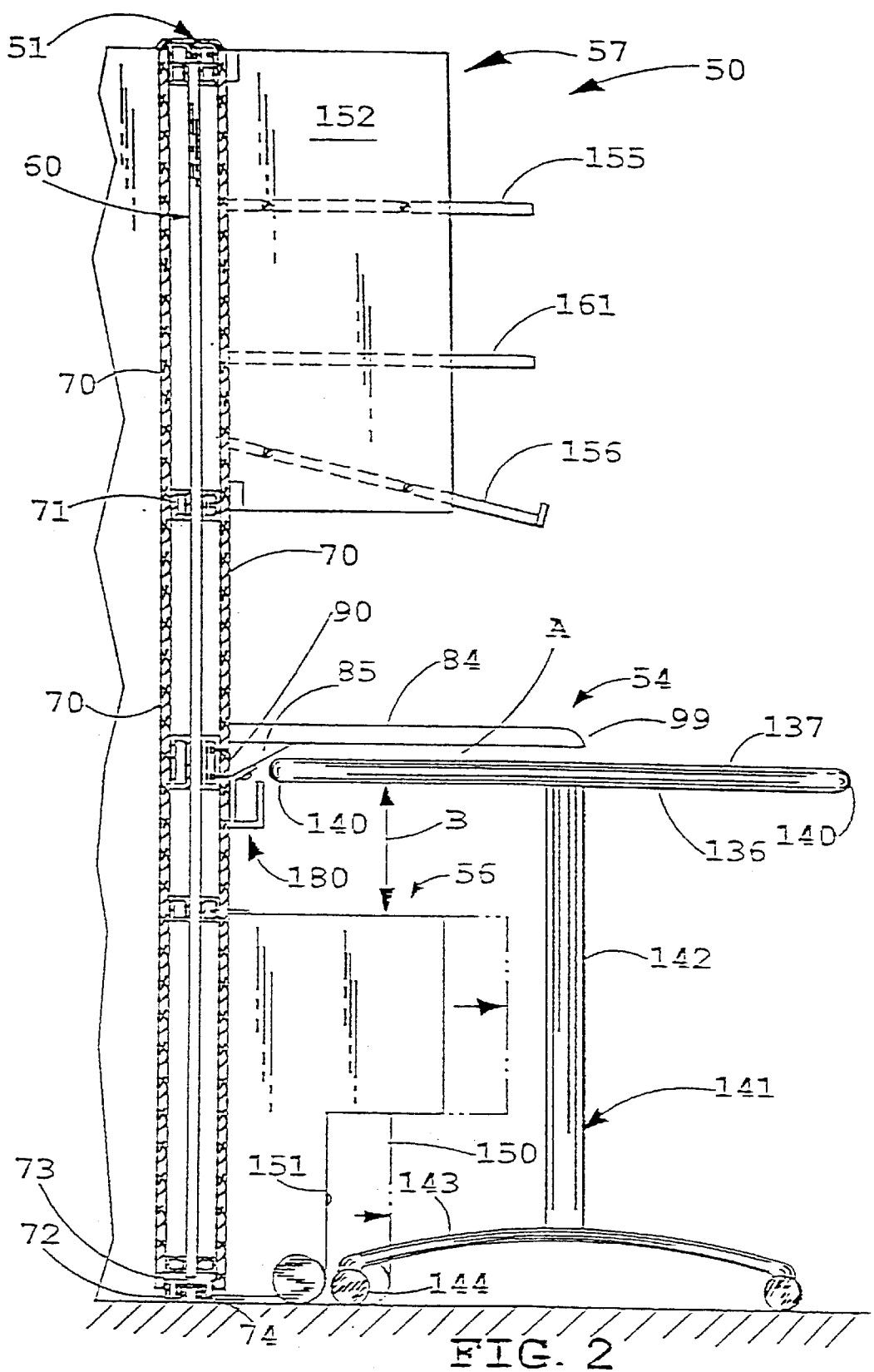
FIG. 2 is a side cross sectional view, partially in cross section.

Datum shelf 54 (FIG. 2) is constructed to remove stored items from the worksurface, but is constructed to place such items within easy reach of a person working on the worksurface. This allows decoupling of the storage function at the worksurface level from the worksurface itself, which is surprisingly and unexpectedly effective, efficient and flexible. It not only frees up workspace, but also allows a user to position the worksurface as close to (or as far from) the datum shelf as desired and further allows the user to move along the shelf to an optimal position. Datum shelf 54 includes a shelf panel 84 and an elongated bracket 85 for supporting the shelf panel 84 on panel 51 (or 52 or 53). Bracket 85 has a triangularly-shaped body 86 (FIGS. 5–6) having a relatively thin vertical dimension of about 3 inches or less that corresponds generally to (but is slightly less than) the vertical dimension of horizontal frame member 63. The space below shelf 54 is open and unobstructed by bracket 85 or by any other structure such that the worksurface of table 55 can be moved under and/or along shelf 54 to an optimal position. The rear side 87 of body 86 is dimensioned to span the area between the rows of slots 66 and 68 on desk-high horizontal frame member 63 and straddle the datum skin strip 90 attached to frame member 63 that covers the longitudinally extending center of frame member 63. Upper and lower hooks 88 and 89 extend horizontally from the rear of rear side 87 and are configured to frictionally engage selected ones of slots 66 and 68, such that body 86 is held in a cantilevered position on desk-high horizontal frame member 63. It is contemplated that hooks 88 and 89 can generate sufficient friction to securely retain shelf 54 to the supporting panel. Alternatively, a locking device such as a detent, friction foot, or opposing hooked bracket (not specifically shown) can be used along the rear of bracket 85 for locking or wedging the hooks in their respective slots. An L-shaped lip 91 defines a forwardly facing recess 92 for mateably receiving a rear edge 93 of shelf panel 84. Reinforcement channels or ribs 94 are formed in the lower diagonally extending leg 95 of body 86 for stiffening lower leg 95. An upper leg 96 of body 86 supports shelf panel 84, and includes holes 97 for receiving screws 98 for retaining shelf panel 84 to bracket 85. Bracket 85 is shown in FIG. 5 as being a two piece weldment, but it is contemplated that bracket 85 could be extruded or roll-formed as a one-piece member, with details such as the hooks being formed in the part after or during the extruding/roll-forming process.

The datum shelf 54 can be any reasonable size, such as 12 inches to 16 inches, but preferably, the outer edge 99 of shelf 54 extends about 15 to 16 inches from the exterior surface of the panel (51, 52 or 53) to which it is attached so that a maximum amount of surface area is provided, but so that the shelf is not classified as a worksurface and accordingly does not have the torsional and vertical load/functional requirements of a worksurface. This allows the shelf to be used for its intended purpose of active paper and document storage and support, but without the need for the extra structural support required by a worksurface. Datum shelf 54 is preferably located a very few inches above the worksurface of table 55, such as about 1 inch to 5 inches, and most preferably is located about 2½ inches to 3 inches above the worksurface of table 55, so that it forms an important working part of the office construction. The datum shelf 54 is physically decoupled from the worksurface of table 55, but is located proximate thereto for active use by the office worker while sitting at and working at the table 55. Notably, this also positions the datum shelf 54 at a height optimally suited for persons confined to a wheelchair. It is also contemplated that the datum shelf 54 and worktable 55 can be located proximate one another at a stand up position, such as for a stand up office where the worksurface and datum shelf are located at about a 4 foot height or somewhat thereabove.

Notably, because of the continuous horizontal rows of slots 66 and 68 in horizontal frame member 63, the shelf 54 can be horizontally adjusted for optimal placement in 1 inch increments at any one selected discrete location along the panel to which it is attached. This makes the shelf 54 particularly useful and user friendly where the office area is not bounded on three sides, but instead is located along an open wall surface or the like since it can be adjusted to an optimal position. (See FIG. 29). Further, it is noted that the datum shelf 54 can be attached to existing partition panels having vertical rows of slots (e.g. Steelcase's 9000 partition panels) and used with a portable desking unit in a manner comparable to that described below, albeit without the horizontal adjustability of the present datum shelf 54.

A modified datum shelf 100 (FIGS. 7–10A) includes a channel support 101 configured for secure attachment to a horizontal frame member 63, and a shelf-forming portion 102 having bent metal brackets 103 thereon for holding a shelf panel 104 on the channel support 101. More specifically, the channel 101 is C-shaped, and includes rearwardly extending flanges 105 and 106 having hooks thereon for engaging selected slots 66 and 68. A central flange 107 extends between flanges 105 and 106, and includes a horizontally extending downwardly facing ridge 108 and further forms an upwardly facing lip 108'. Shelf-forming portion 102 includes a downwardly facing hook-shaped member 109 attached to the top of a rear edge 109' of shelf panel 104. Brackets 103 are attached along the rear edge of shelf panel 104 at spaced apart locations, and each include a toe 110 for fitting under ridge 108. A hole 111 is formed in each toe 110 for receiving a screw 112 that extends through toe 110 into ridge 108 to retain bracket 104 and thus shelf-forming portion 102 to channel 101. The shelf 100 is attached by hooking the hook-shaped member 109 onto the top lip 108' and rotating the shelf 100 to a horizontal position. The screws 112 are then attached to secure the shelf 100 in place.

Another modified datum shelf 250 (FIG. 10B) includes a frame-engaging external horizontal member 251 and a shelf subassembly 251'. Frame-engaging exterior horizontal frame member 251 includes hooks 252 and 252' for engaging selected slots in the horizontal row of slots 66, 68 and 69, and further includes a horizontal concave body 253. The body 253 defines a plurality of vertically oriented pairs of slots 254 and 255 spaced apart along the body 253. The shelf subassembly 251' includes a shelf panel 256, and a plurality of triangular brackets 257 for supporting the shelf panel 256. The triangular brackets 257 include a rear edge having vertically/downwardly oriented hooks 258 and 259 for engaging slots 254 and 255. The concavity of horizontal concave body 253 spaces the rear edge of shelf panel 256 forwardly from the exterior surface of skins 90 and in effect creates a trough for managing wires therein along the rear edge of the datum shelf 250.

A second modified datum shelf 265 (FIG. 10D) includes a shelf panel 266 supported directly on the horizontal frame member 63 by a shelf bracket 267. The shelf bracket 267 includes hooks 268 and 269 configured to frictionally engage the slots 66, 68 and 69 in horizontal frame member 63. The brackets 267 include an aperture 270 in their free end for receiving a screw 271 to secure the shelf panel 266 to bracket 267. Shelf panel 266 is secured by additional screws, adhesive, or other means as required to provide stability to shelf 266. The illustrated brackets 266 include an I beam-like arrangement of flanges, including a center flange 269', a top flange 270', and a bottom flange 271'. Other shapes are also contemplated.

Notably, the shelf brackets can be adapted for different functions, or adapted to minimize cost in low stress areas. Datum shelf 275 (FIG. 10F) includes a shelf panel 276, a channel 277 attached along its rear edge 278, and brackets 279 and 280 configured to engage horizontal frame 63 to support shelf 276 and channel 277 thereon. Bracket 279 is hollow and includes an opening in its upper rear face, and a side opening. The side opening both receives the channel 277 and provide means for routing wires through hollow bracket 279 from the worksurface to the channel 277. Where desired, channel 277 can be extended completely along the rear edge 278 of shelf panel 277. The second bracket 280 is flat, and includes an apertured plate 281 for attachment to the top side of channel 277, and further includes hooks 282 for attachment to the horizontal frame member 63.

A corner slip-fit shelf 114 (FIG. 11) is particularly adapted for adjustably joining two of datum shelves 54 (or 100). Corner shelf 114 includes a top plate 115 having orthogonal rear edges 116 for positioning against two perpendicular panels, such as against panels 51 and 52 (or against panels 52 and 53) and hooks 116 at least along one of the edges for engaging slots in the associated horizontal frame member 63. Top plate 115 further includes an aesthetically contoured front edge 117. Generally in the center of top plate 115 there is formed a downwardly bent front flange 118 that forms with front edge 117 a pair of open recesses 119 and 120 for telescopingly receiving the ends of shelves 54A and 54B. A vertically extending corner bracket can be attached to panels 51 and 52 to further support the rear corner of shelf 114 if desired, although it is not contemplated to be necessary in shelf 114.

Notably, the front edge 117 of corner shelf 114 can be cut straight across or arcuately shaped, and the vertical edge profile can also be shaped as desired. An important feature of this construction is that the shelves 54A and 54B can be adjusted along the panels 51 and 52, such as during reconfiguration to change the size of the office areas. Nonetheless, the same shelves 54A and 54B can continue to be used since the change in dimensions of the offices can be taken up by the telescoping adjustment of the shelves 54, as illustrated in FIGS. 11A and 25. Notably, it is contemplated that the corner shelf 114 can be "one sided" (i.e. allow for telescoping adjustment in only a single direction, such as by having only one open recess 119 therein). Also, an in-line spanner shelf (not specifically shown) can be constructed to bridge between horizontally adjacent and aligned shelves 54 where the shelves are spaced a short distance apart. In such case, the in-line spanner shelf would have two opposite edges having a downwardly facing concave construction (similar to recess 119 of corner shelf 114) for telescopingly receiving the adjacent ends of the in-line shelves 54.

A modified corner shelf 124 (FIGS. 12–13) is constructed for increased weight-bearing, such that it can support a keyboard support 125. In modified shelf 124, a top plate 126 and a bottom plate 127 are sandwiched together on opposite sides of the orthogonally related shelves 54. The plates 126 and 127 are secured together by a bolt 128. The proper spacing of the plates 126 and 127 is maintained by a spacer 129, such that the plates do not contract together when bolt 128 is tightened. The front flange 129' and also side flanges also maintain the proper spacing of the plates 126 and 127. Attachment plates/brackets 130 are attached to top plate 126 along the side edges thereof, the attachment plates/brackets 130 including hooks that securely engage slots 68 in horizontal frame member 63 and help support the weight of shelf 124 and items place on or hung thereon. Alternative, the brackets 130 can be incorporated into the edge detail of the plates 126 and 127. Keyboard support 125 includes a generally flat carriage 131 for supporting a computer keyboard, and an adjustment arm 132 for adjustably supporting flat carriage 131. The adjustment arm 132 includes a flat anchor bracket 133 that engages the underside of bottom plate 127, and is secured thereto by screws or fasteners 134 that extend into spacer 129. Arm 132 comprises a linkage with resilient springs therein for supporting the pan 131 and a keyboard thereon in a selected position optimally suited for typing. A variety of keyboard supporting arms and mechanisms are known in the art, such that a detailed description of same is not required for an understanding of the present invention.

The portable table 55 (FIG. 1) includes a kidney-shaped or oblong curvilinearly-shaped top 136 defining a worksurface 137 optimally suited to cooperate with the shelves 54 in the office construction 50. The top 136 includes a large end 138 shaped to allow multiple papers to be spread around during a paper intensive work task, and also includes a smaller end 139 shaped to allow the worker to move the table partially under a shelf 54 so that items (e.g. reference books and the like) can be easily accessed even while continuing to sit at and work at the table 55. Also, the table 55 can be moved adjacent the keyboard support 125 such that an end of the table can be used to both support a computer mouse, but also to support papers being typed (see FIG. 30). The edge 140 of top 136 is rounded or beveled to provide a blunt surface for aesthetics and to reduce damage thereto as the table is moved around. Table 55 includes a pair of legs 141 each having a post 142 and two laterally extending stabilizing portions 143. Castors 144 are operably mounted on the ends of the stabilizing portions 143 so that the table 55 is relatively easily moved, and, depending upon the floor surface, optionally includes manually operable brakes, friction-generating wheels that resist inadvertent table movement, or tethers on the table 55 to prevent undesirable wandering or "creep" of the table during use. Top 136 includes a marginal edge section that extends from the attachment of post 142 and that is cantilevered outwardly to table edge 140. The marginal section is adapted to extend under datum shelf 54 a dimension "A" which is about 2½ inches to 3 inches therebelow, and above a top of under shelf storage unit 56 a dimension "B" which is about 10 inches or so. This overlapping relationship of table edge 140 with shelf 54 and under shelf storage unit 56 allows for dense storage of the table 55 proximate one of panels 51–53 in the office, and also allows materials to be stored on the under shelf storage unit 56 in a highly visible and accessible location. The ability to position table 55 at a variable position further allows the user to effectively select the depth of table that is best suited for the particular task being performed. This is particularly useful where the worker may need to access books or materials on the shelf 54 while working, and still further is particularly useful where the worker may need to move the table along the shelf 54 to access different areas on the datum shelf. The openness under the shelf 54 also facilitates free movement of table 55 under the shelf 54.

The under shelf storage unit 56 (FIG. 14) includes a cabinet 145 and a wheeled drawer 146 operably mounted therein. The cabinet 145 is attached to the panel 52 (or 51 or 53) by plate brackets 147 attached to the top and the bottom of the cabinet 145. In particular, the brackets 147 include hooks 148 configured to engage selected slots 65 and 66 in horizontal frame members 62, and further include bodies 149 with holes therein for receiving screws to attach the brackets to the cabinet 145. It is contemplated that one or more of the brackets could be welded to the back of the cabinet instead of screwed thereto, and/or that the cabinet could be shifted sideways to engage the hooks into the slots in the horizontal frame members. Alternatively, it is contemplated that the under shelf storage unit can be left unattached. In such case, the cabinet includes outwardly extending legs or feet for stability, or the recess in the cabinet is eliminated so that the front of the cabinet is not cantilevered.

In a preferred form, the under storage unit 56 includes a recess 150 formed along its front edge at the floor, the depth of the recess being formed by a surface 151. This recess 150 (FIG. 2) has a depth chosen so that, when the table 55 is pushed against the under storage cabinet and the stabilizing portions 143 on the 141 legs engage the back surface 151 of the recess, the table edge 140 is stopped short of the shelf bracket 85. This prevents damage to the table edge 140, and further provides a smooth guide along the panels 51–53 where-ever under storage unit 56 is present.

Figure 16:
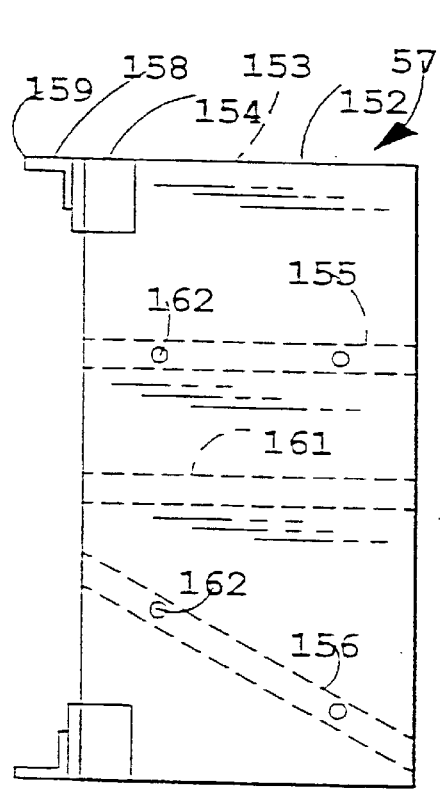
FIG. 16 is side view of the upper storage unit shown in FIG. 1.
Figure 17:
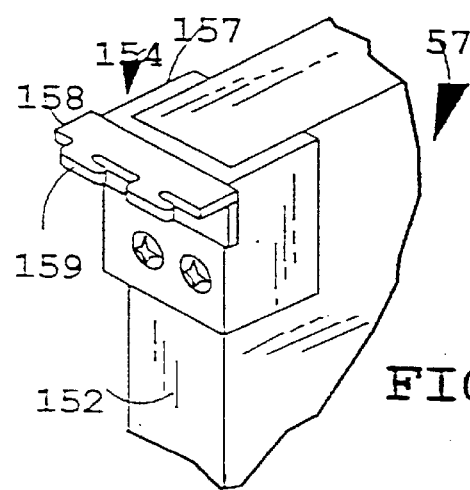
FIG. 17 is a fragmentary top perspective view of an upper corner of the blade forming a side of the upper storage unit shown in FIG. 16.
Figure 18:
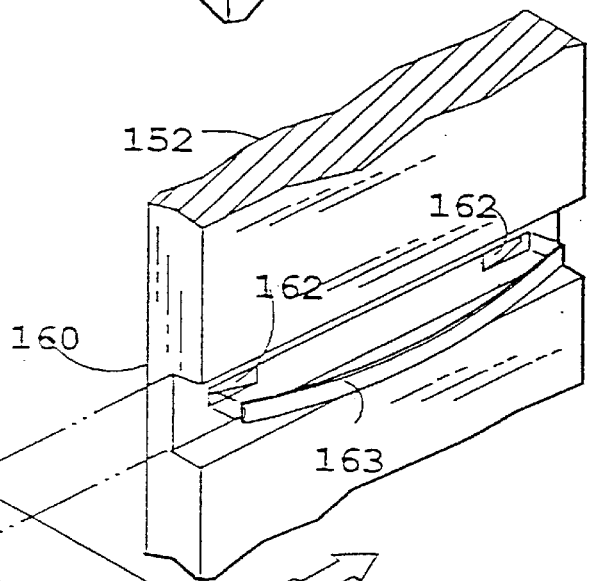
FIG. 18 is an exploded fragmentary perspective view of an inside of the blade shown in FIG. 16 and the adjustable height shelf engageable therewith.

The upper storage unit 57 (FIGS. 16–18) includes a pair of spaced apart blades 152 and 153 attached to panel 51 (or panels 52–53) by blade brackets 154, and a pair of fixed shelves 155 and 156 attached to blades 152 and 153. The blade brackets 154 include a U-shaped section 157 for receiving a rear edge of the blades 152 (and 153), and the blades are secured therein such as by adhesive or screws. The blade brackets 154 also include a rearwardly extending portion 158 having hooks 159 thereon for engaging selected ones of slots 65–68. It is noted that different length blades can be provided other than those illustrated in FIG. 1, such as blades that extend from the floor to above head height. The hooks 159 (FIG. 16) on the blades 152 and 153 preferably face in opposite directions such that when shelves 155 and 156 are attached, the assembly is securely interlocked to the panel 51. The blades 152 and 153 each include channels 160 on their inside surface for receiving shelves 155 and 156, and for receiving adjustable shelf 161. The fixed shelves 155 and 156 are positioned in their corresponding channels, and screws 162 are extend through blades 152 and 153 for securing the fixed shelves 155 and 156 in position. The channels for the adjustable shelf 161 include an angled notch 162 at each end. A strip of material 163 such as spring steel is positioned between the angled notches 162, with the ends of the strip 163 extending into and pressing against the notches 162. The adjustable shelf 161 includes an edge detail defining a recess 164 for receiving the strip 163 as the adjustable shelf 161 is pressed into the channels 160 between blades 152 and 153. The strip 163 frictionally engages the adjustable shelf 161 to retain it in position between the blades 152 and 153.

A modified above-shelf upper storage unit 300 (FIG. 18A) includes blades 301 and a blade support bracket 301' for supporting each of the blades 301. The blade support bracket 301' includes a U-shaped vertical section 302 configured to securely engage and support the rear edge of blade 301, and further includes top and bottom sections 303 and 304 with hooks 305 and 306 therein for engaging the slots in the respective horizontal frame members to which they are attached. Blades 301 can be secured to blade support bracket vertical section 302 by adhesive, screws, interlocking angled tabs, or the like. The blade 301 includes an inner surface 307 having a series of vertically spaced notches 308 and 309, the notches 308 facing oppositely from the notches 309. A shelf support bracket 310 has a resilient center strip 311 and L-shaped feet 312 and 313 at either end. The notches 308 and 309 include undercuts, and feet 312 and 313 include toes 314 and 315 configured to securely engage the undercuts. The shelf support bracket 310 is attached by flexing the center strip 311 (FIG. 18C) so that the toes 314 and 315 can be fit into the undercuts of notches 308 and 309. When released (FIG. 18D), the toes 314 and 315 securely hold bracket 310 to blade 301.

Figure 18E:
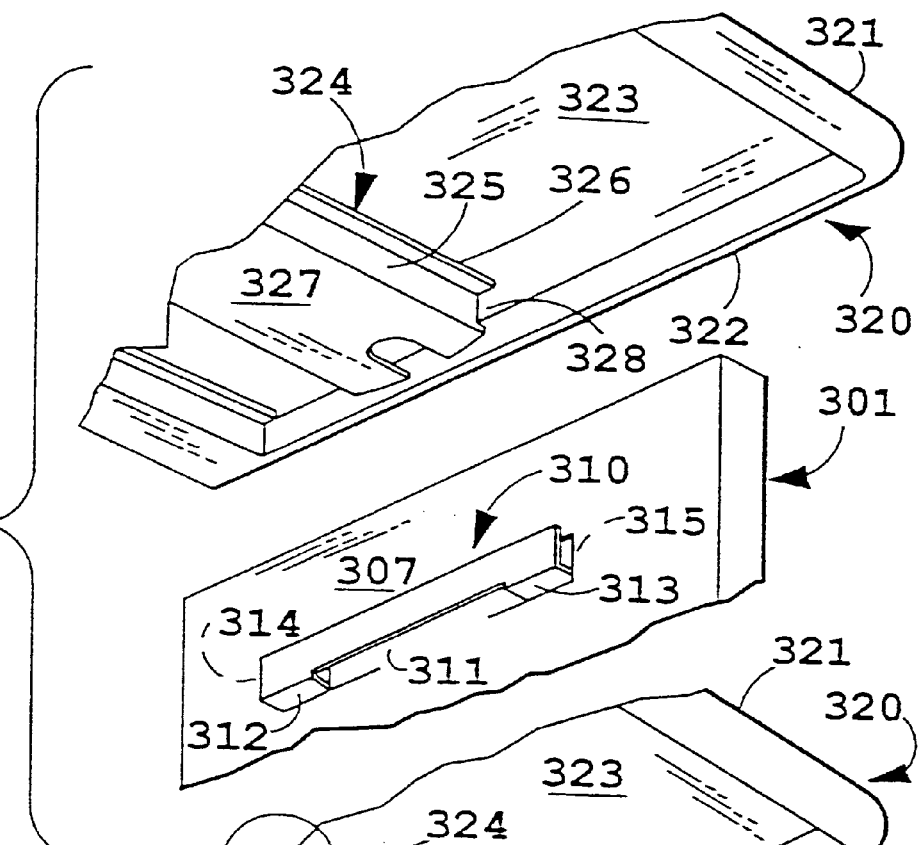
Figure 18F:
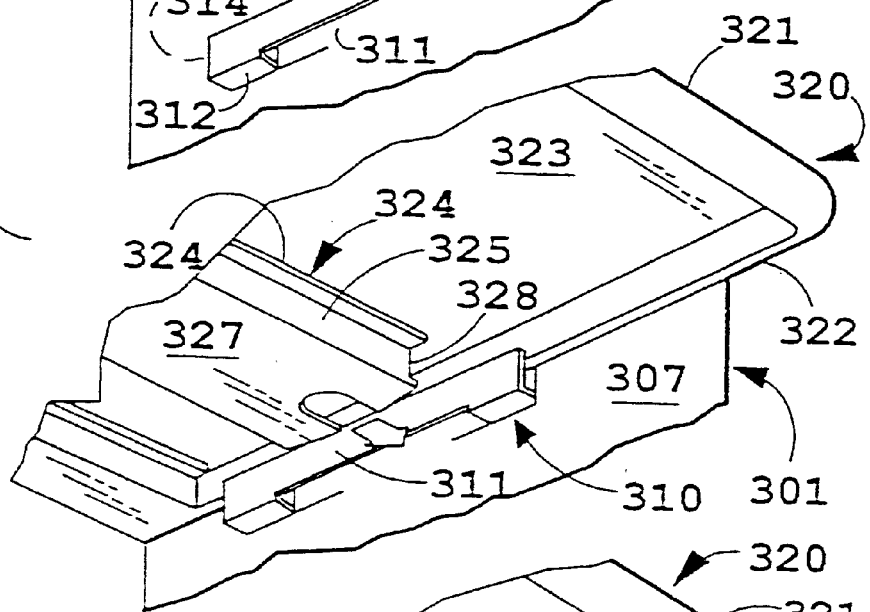
Figure 18G:
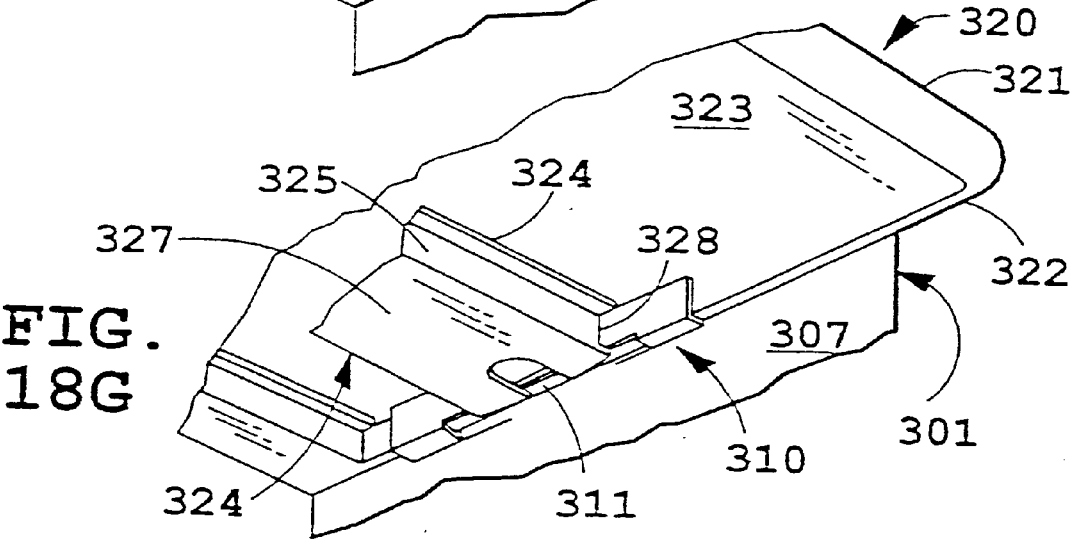

An adjustment shelf 320 (FIG. 18E) includes a bottom detail particularly shaped to mateably engage the shelf support bracket 310. The shelf 320 includes a pan 321 having an edge flange 322 and an undercut recess 323. A horizontal cross beam 324 is secured under shelf pan 321, the end of the beam 324 being spaced slight from edge flange 322. The end of beam 324 includes side flanges 325, top flange 326, and bottom flange 327, with the side flanges 325 being foreshortened and forming a pocket 328 facing the pan edge flange 322. In the installed position, the center strip 311 is spaced from the inside surface 307 of blade 301. This allows the pan edge flange 322 to be slipped into the space between center strip 311 and inside surface 307. Also, the center strip 311 is flexible such that it can be flexed out of the way (FIG. 18F) and then released to flex into the pocket 328 (FIG. 18G) for secure engagement, thus holding the shelf to blade 301 and the blade 311 to the shelf 320.

A modified adjustable shelf 360 (FIG. 18H) is similar to modified adjustable shelf 320, but adjustable shelf 360 incorporates the shelf support bracket 310. Specifically, the shelf 360 includes an edge 361 for positioning adjacent the inside edge 307 of the blade 301. A tubular cross brace 362 is formed under the pan 363 of adjustable shelf 360. Interlock toes 364 and 365 are supported by resilient leaf-spring-like members 366 and 367, that extend from within brace 362. The toes 364 and 365 are positioned to be flexed out of the way by pressing on exposed sections of the toes 364 and 365 through apertures 370 and 371. The shelf 360 is then positioned between blades 301 and the toes 364 and 365 are released, causing them to flex to an interlocked position wherein they engage notches 308 and 309 in blade 301.

An adjustable corner shelf 375 (FIG. 18I) has an L-shaped configuration, and is mateably engageable with a corner bracket 376 for use with blades 301. The construction of adjustable corner shelf 375 is comparable to anyone of shelves 320 or 260, for example, with the exception the corner shelf 375 includes a rear corner 377 that mateably engages notches 378 in corner bracket 376. The notches 378 of corner bracket 376 correspond in height to the notches 308 and 309 in the blades 301. Corner bracket 376 is supported on the partition panels 51–52 (or 52–53) by engagement of hooks on corner bracket 376 with horizontal frame members 63 and/or 64.

Where desired, doors 166 (FIG. 1) can be attached to the front of blades 152 and 153 for closing off the shelves secured therein. Also, a drape or curtain can be provided for this purpose, the advantage being that a drape or curtain can be rolled up like a window shade for compact storage. In another alternative, a pull-out, pivot-down door 167 is provided (FIG. 1). The door 167 includes a lip 168 along its lower edge that acts as a handle for pulling the door outward. The door 167 slides along a pair of tracks 169 located under the bottom fixed shelf 154. In one form, the door 167 pivots to a lowered position wherein the lower edge of the door 167 rests on the shelf 54 and is positioned at an angle. In this position, the door 167 can be used to support papers, such as for typing when using the computer keyboard, with the papers resting on the lip 168 for vertical support.

Shelf dividers 170 (FIG. 1, left side of drawing) are provided for subdividing the space on datum shelf 54 into desired sections. The shelf dividers 170 include a panel 171 that extends substantially the depth of shelf 54, and further include a spring clip 172 along their front edge for clip-attachment to the front edge of shelf 54. The rear of shelf dividers 170 can include a detail for stability if desired, such as a protrusion for selectively engaging one of a series of mating holes along the rear of the shelf 54, or such as a T-shaped tail bracket for engaging a groove running along the rear edge of the datum shelf 54.

Wire management is provided by shelf 54 along partition panels 51–53 on an outside of the panels as follows. Electrical receptacles 175 and telecommunication connections (FIGS. 19–20) are provided along panels 51–53 as desired, with the majority of power and communication being positioned along spine panel 51. The receptacles 175 are provided either above or below to the shelf 54, or both. Wires 176 are communicated through apertures 177 and 178 in the shelf support bracket 85 along the rear edge of the shelf 54. Wires 176 are managed horizontally by extending the wires along the inner horizontal cavity 179 defined within the body of the shelf brackets 85. Where additional wire carrying capacity is desired external to the panel 51 (or 52–53), a wire trough 180 is attached under the shelf support bracket 85. Trough 180 includes a U-shaped, upwardly open main portion 181, and a flange 182 shaped for mating attachment to shelf bracket 85.

In order to better illustrate the present invention, an office area 185 utilizing traditional furniture 187A, 187B, and 187C and having a floor space 188 is shown in FIG. 21. Office area 185 is defined by panels 186A, 186B, and 186C arranged in a U-shaped arrangement. Worksurfaces 187A, 187B, and 187C are shown as being positioned within office area 185 also in a U-shaped arrangement, the worksurfaces 187A, 187B, and 187C each being 2 feet deep. The panels 186A, 186B, and 186C are located on 8 feet by 8 feet centerlines and are about 4 inches thick, such that the internal dimension of the office area 185 is about 7 feet 8 inches by 7 feet 8 inches, or in other words about 59 square feet. Of this 59 square feet, about 38 square feet is surface area and about 21 square feet (i.e. 3 feet 8 inches by 5 feet 8 inches) is floor space. In other words, about 36 percent of the 59 square feet is floor space. Notably, it takes an open floor area of at least about 3 feet 6 inches in radius or width for a person to comfortably rotate and move a task chair around so that the person's knees do not interfere with structure under or around the worksurface and office area. Thus, in the office area 185, the open floor space cannot be made much smaller without floor space problems.

In contrast, if the same office area is furnished with the present inventive furniture components, including at least datum shelf 54 and under shelf storage unit 56 (FIG. 22), a substantial increase in floor space is achieved. Specifically, as shown in FIG. 22, since the shelves 54 have only a 16 inch depth from the panels, the floor space 189 of office 185A (which has an area of 7 feet 8 inches by 7 feet 8 inches) is increased to about 32 square feet (i.e. 5 feet by 6 feet 4 inches). This is 54 percent of the square footage for the office 185A. The effect of the increase in floor space is dramatic. Specifically, the increase of floor space is from 39 percent in the "traditional" office, to 54 percent in the "new" office using the present components including the datum shelf 54. Significantly more room is provided for maneuvering and working, as well as the environment of the office becomes visually relatively more spacious.

If the large open floor space (i.e. 6 feet 4 inches by 5 feet) is not needed, the panels 186 can be reconfigured as shown in FIG. 23. In FIG. 23, the panels 186A and 186C are adjusted on panel 186B to define an office area 185B that has an internal space 189A of 7 feet 8 inches by 6 feet 4 inches (i.e. about 49 square feet). This still provides the office worker with more open floor space (i.e. 3 feet 8 inches by 6 feet 4 inches, or about 23 square feet) than was in the office 185 furnished with traditional furniture (which was 3 feet 8 inches by 5 feet 8 inches, or about 21 square feet). Notably, the panels 51–53 are optimally suited for reconfiguration of the office arrangement such as shown in FIG. 23 since the panels 51–53 are configured to permit the incremental adjustment of the office size by relocating the perpendicular fin panels 52 and 53 along the spine panel 51. (See FIG. 1).

Offices that are 6 feet by 6 feet are historically particularly problematic since there is limited room to make the office workspace into a U-shaped arrangement. Thus the office worker is limited to a single desk-type worksurface that presents only a single front edge to work from. FIG. 24 illustrates this by showing an office arrangement 190 having panels 191A, 191B, and 191C positioned in a U-shaped arrangement, and having a 3 feet by 6 feet desk positioned a rear part of the office area. The desk 192 has a worksurface of about 18 square feet (i.e. 3 feet by 6 feet) and the remaining space in the office area is also about 18 square feet (i.e. 3 feet by 6 feet). We, the inventors, have discovered that most worker utilize about 3 square feet on a worksurface as their primary work area. This means that about 15 square feet of the worksurface of the desk 192 is storage space, such as for storing papers, work-in-progress materials, reference books, staplers, pencils, and the like. By simple calculation, about 50 percent of the area 193 of office 190 is open/unobstructed floor space (i.e. 18 square feet divided by 36 square feet), about 42 percent of the office area 193A is storage (i.e. 15 square feet divided by 36 square feet), and about 8 percent is work area 193B (i.e. 3 square feet divided by 36 square feet).

The 6 feet by 6 feet office area 195 of FIG. 25 is dramatically different than the office area 190 shown in FIG. 24. The office area 195 (FIG. 25) includes shelves 54 attached in a U-shaped arrangement around panels 51–53. The panels 51–53 are arranged to provide the 6 feet by 6 feet floor plan of the office area. The worker is provided with the major advantages of a U-shaped office arrangement since the shelves provide a highly accessible document support area close to worksurface height and also storage area all around the worker. The storage area is within arm's reach of the worker along its full length. Significantly, the open floor space 196 is about 15.5 square feet (i.e. 4 feet 8 inches by 3 feet 4 inches or about 43 percent of the 36 square feet in the office area), while the shelf/storage area of shelves 54 is about 20 square feet (i.e. 1 foot 4 inches times the length of the shelving around the panels 51–53, or about 55 percent of the 36 square feet in the office area). The table 55, which provides an area of at least 3 square feet, and preferably about 8 to 10 square feet, does not subtract from the open office area since the table 55 is moveable out of the way under datum shelves 54 when not in use, or out of the office entirely if desired. Contrastingly, when in use, the table 55 is moved to an optimal depth under the shelves 54 and to an optimal location along the shelves 54. Notably, the shelves are positioned only a few inches above the worksurface of the table 55, and preferably are about 2½ to 3 inches thereabove, such that items on shelf 54 are readily and easily accessible while working at worksurface 55. Presuming that the table 55 is about 9 square feet for the illustrated office area 195, the effective worksurface provided by the table 55 represents up to about 25 percent of the 36 square foot area of the office. It is noted that this configuration will work for stand up offices and work areas, as well as for traditional sit down offices.

FIG. 26 illustrates a plan view of a cluster of three offices 220, 221, and 222, each configured into a different arrangement utilizing the same office furniture components shown in FIG. 1. Office 220 is a 6 feet by 6 feet office having shelves 54 on two sides, and a keyboard support 125 and computer monitor supported at the corner of shelves 54 on a corner shelf 124. An under storage unit and an upper storage unit (not specifically shown) can be used if desired. Office 221 is a 6 feet by 7 feet office that includes shelves 54 on three sides, a keyboard support 125 and computer monitor supported on a corner shelf 124 at one of the corners of shelves 54, and a portable worktable 55 temporarily positioned adjacent the computer work area. A transaction shelf 223 is attached to a top of the panel 52 at the entrance to the office area 221, and a transaction table 224 is attached to a top of the other panel 53 also at the entrance to the office area 221. Under shelf storage units (not specifically shown) are used extensively in the office 221, and also an on-shelf multilevel paper tray/storage deck 225 (FIG. 1) located under the transaction table 224 on shelf 54 (see FIG. 1). Office 222 is a 6 feet by 6 feet office arranged in a configuration similar to office 221. The office 222 includes shelves 54 arranged in a U-shaped plan configuration, and also includes a corner shelf 124 and keyboard support 125. However, the table 55 for office 222 is temporarily located outside of the office 222 for convenience. It is noted that the marginal edge of table 55 generally mates with the shape of the transaction table 224.

Figure 27:
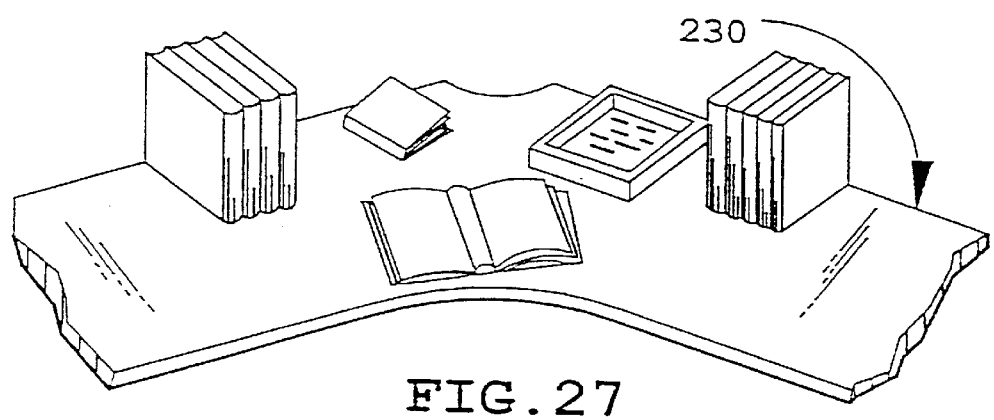
FIG. 27 is a perspective view of a large worksurface utilized in a traditional manner.
Figure 28:
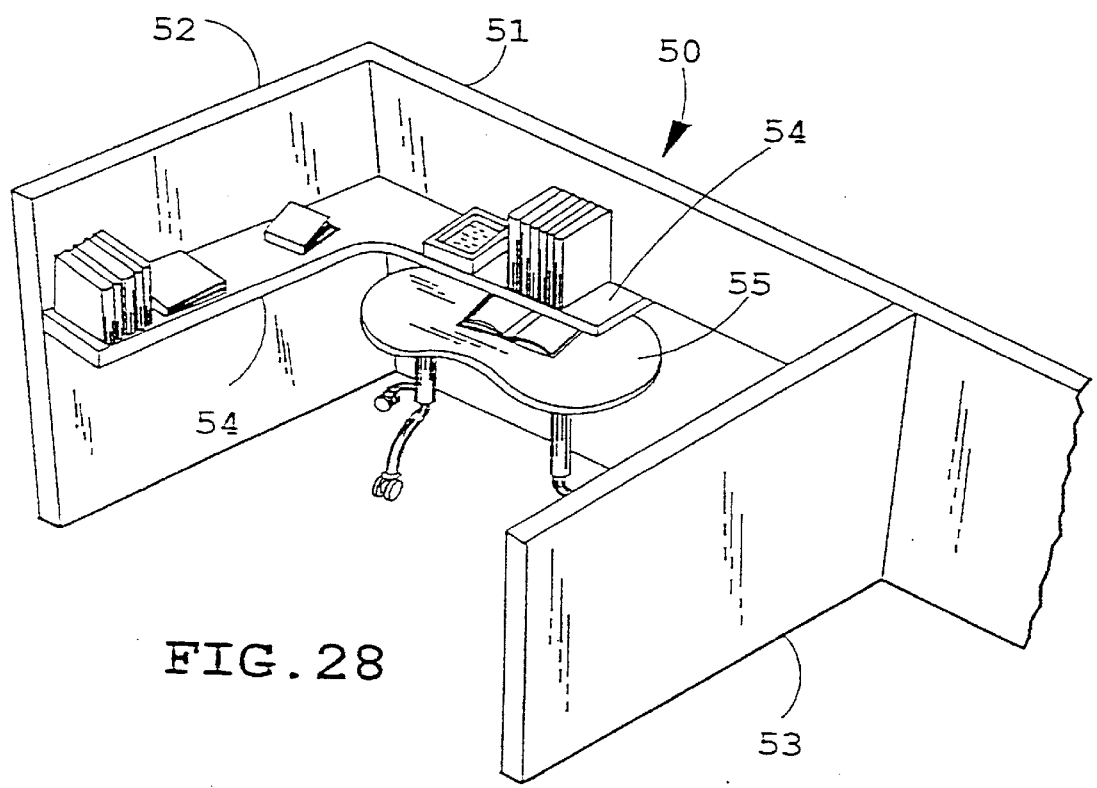
FIG. 28 is a perspective view of the present furniture construction as utilized in the novel manner of the present furniture construction but to accomplish the same function as shown in FIG. 27.

FIG. 27 is a perspective view of a large worksurface 230 utilized generally in a traditional manner. FIG. 28 is a perspective view of the present furniture construction 50 including the shelf 54 and the portable table 55 as utilized in the novel manner of the present invention to accomplish the generally the same function as that shown in FIG. 27. Notably, the table 55 is moveable to an optimal location relative to the shelf 54, both in terms of depth and also along the shelf 54.

Figure 29:
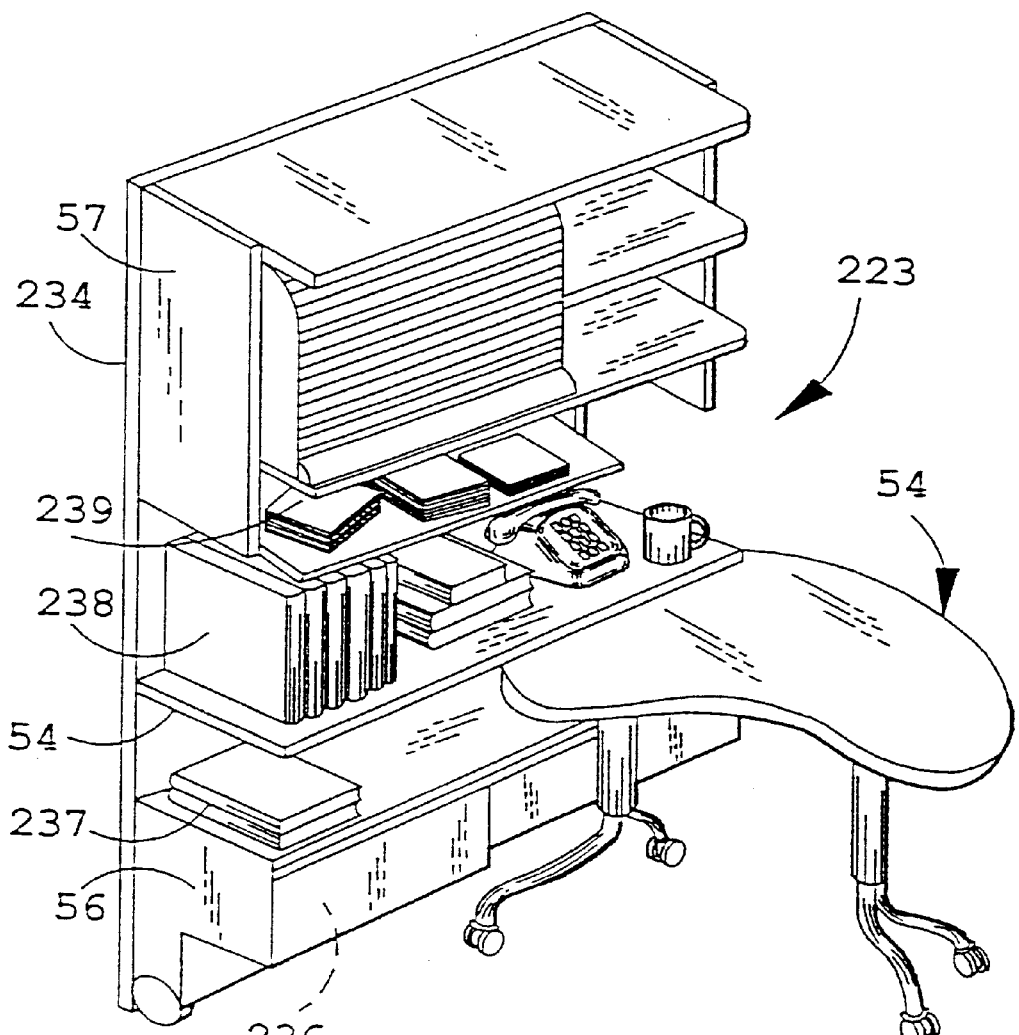
FIG. 29 is a perspective view of a mini-office positioned along a single partition panel outfitted with the present furniture components shown in FIG. 1, the mini-office illustrating the storage capabilities of the present system.

FIG. 29 illustrates the present furniture construction being used as a mini-office 233 along a single partition panel 234. In FIG. 29, the panel 234 is attached to a fixed building wall 235, or otherwise is supported so that it can support the cantilevered weight of shelf 54, under storage unit 56 and upper storage unit 57. As apparent from FIG. 29, the arrangement provides for highly dense storage of materials at multiple locations 236–239, yet permits all of the advantages of the concurrent use with portable table 55 which can be extended under shelf 54 in close proximity thereto.

Figure 30:
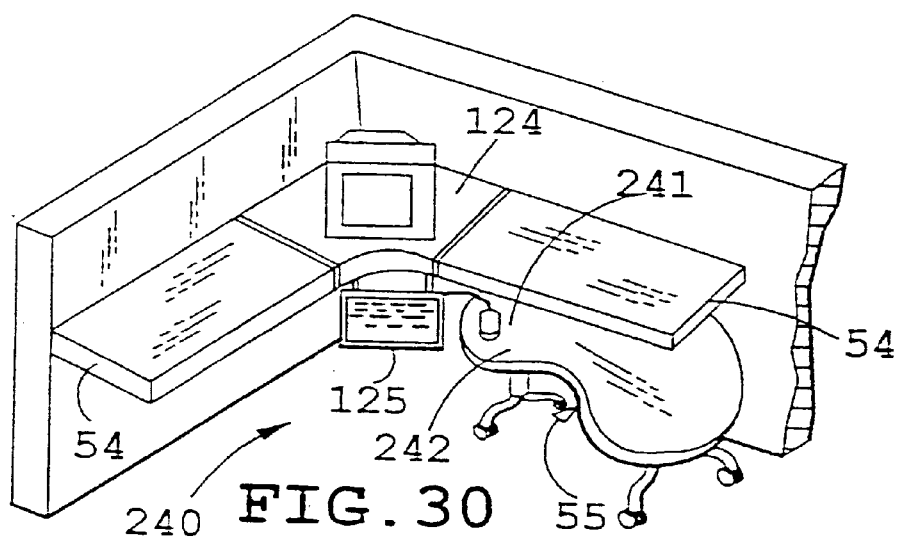
FIG. 30 is a perspective view of a U-shaped office outfitted with the furniture components of FIG. 1 and configured for use with a computer.
Figure 34:
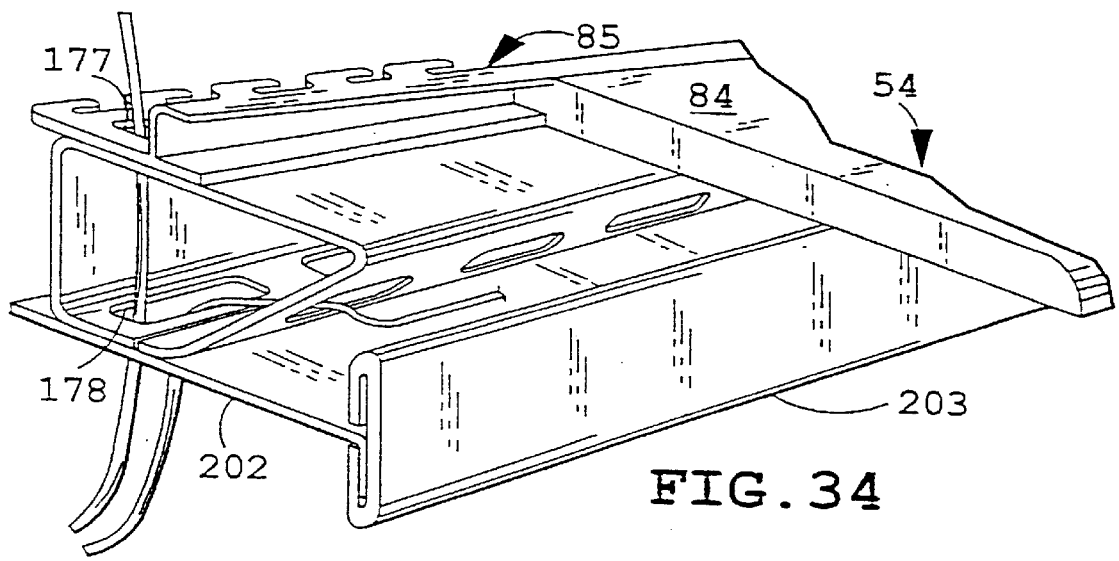
FIG. 34 is a fragmentary perspective view of the second modified shelf bracket shown in FIG. 33.

FIG. 30 is a perspective view of a U-shaped office 240 configured for use with a computer. In office 240, the shelves 54 and corner shelf 124 are configured to support a keyboard support 125 with a computer monitor supported on corner shelf 124. The table 55 is moved to a location where its narrow end 241 is positioned proximate the corner shelf 124. In this position, the narrow end 241 includes a portion 242 that extends outboard of the shelf 54 only a short distance, which distance is optimally suited for use with a computer mouse.

Where added control of mobile table 55 is desired, an under shelf bumper 200 is used. The under shelf bumper device 200 is formed as an integral part of the modified datum shelf bracket 201. Bracket 201 is not unlike shelf bracket 85, with the exception that it has a leg 202 that extends generally horizontally forwardly from a bottom shelf bracket 201. A large resiliently stiff bulbous bumper strip 203 is attache to the outward end of leg 202 at a height such that the table edge 140 (FIG. 32) engages strip 203 as the table 55 is moved under datum shelf 54 toward the panel 52 (or 51 and 53). The leg 202 is slightly arcuate in shape, such that the momentum of table 55 is absorbed when table 55 abuts it, whereby the table 55 is stopped and/or bumped away. In bumper device 200, a mating small bumper 205 is located along the rear edge of the shelf 54 to provide an aesthetic trim line and book stop along the rear of datum shelf 54. As illustrated in FIG. 33, an L-shaped tubular wire protector sleeve 208 and a straight wire protector sleeve 209 can be slipped into the apertures 177 and 178 in shelf bracket 85 to protect wires extended through the apertures 177 and 178. The sleeves 208 and 209 each include a rectangular tubular body 210 adapted to fit through the aperture 177, and an upper lip 211 adapted to retain the sleeve at a predetermined height in the aperture 177 relative to the shelf bracket 85.

Figure 35:
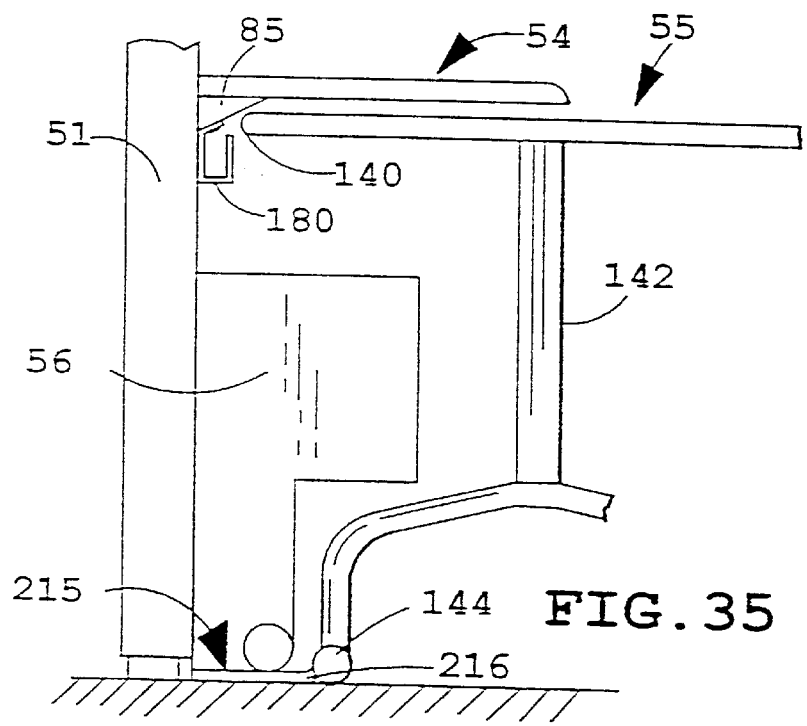
FIG. 35 is a fragmentary side view of the present furniture construction, including a modified bumper construction positioned adjacent the floor.

In an alternative construction, a floor-height bumper 215 (FIG. 35) is attached to the floor channel 72 or to the under storage unit 57. The bumper 215 includes an outer edge 216 having a sufficient vertical dimension to rebuff the table 55 as the table 55 is moved toward the panel 51 (or 52–53). It is contemplated that the bumper 215 can be non-linearly shaped so that, for example, it causes the table to move away from the panel 52 as the table is moved along the panel 52. Alternatively, bumpers can be located on table 55 at a location under the marginal edge 140, so that the bumpers on the table engage the under shelf storage unit 56, instead of visa versa.

Figure 36:
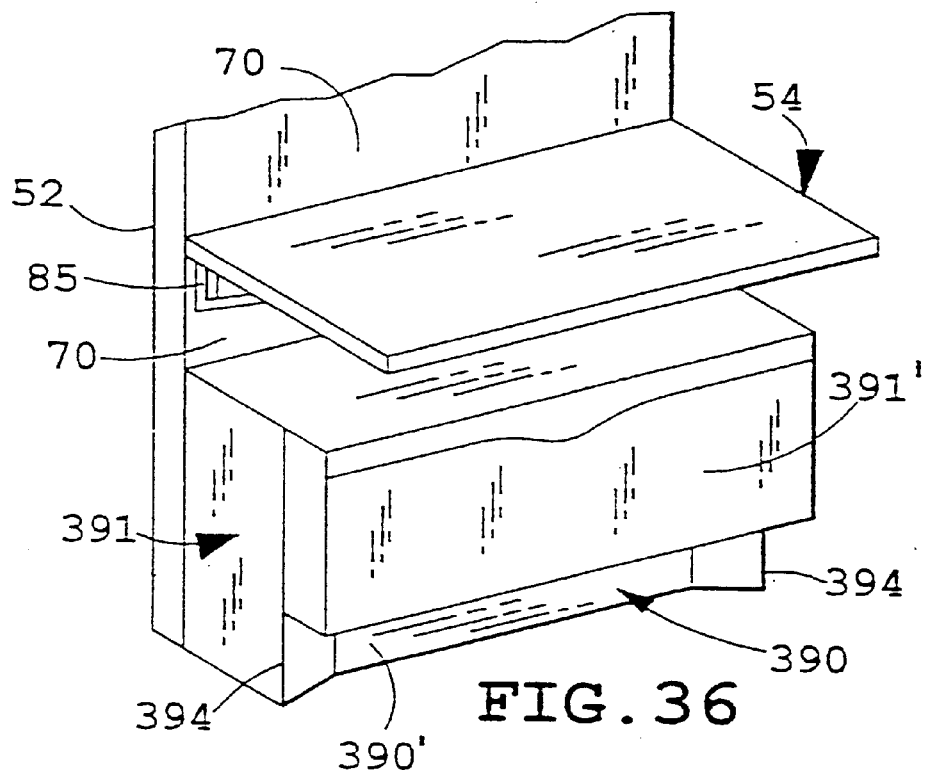
FIG. 36 is a fragmentary perspective view of a modified under shelf lower storage unit including a configured floor-adjacent recess.
Figure 37:
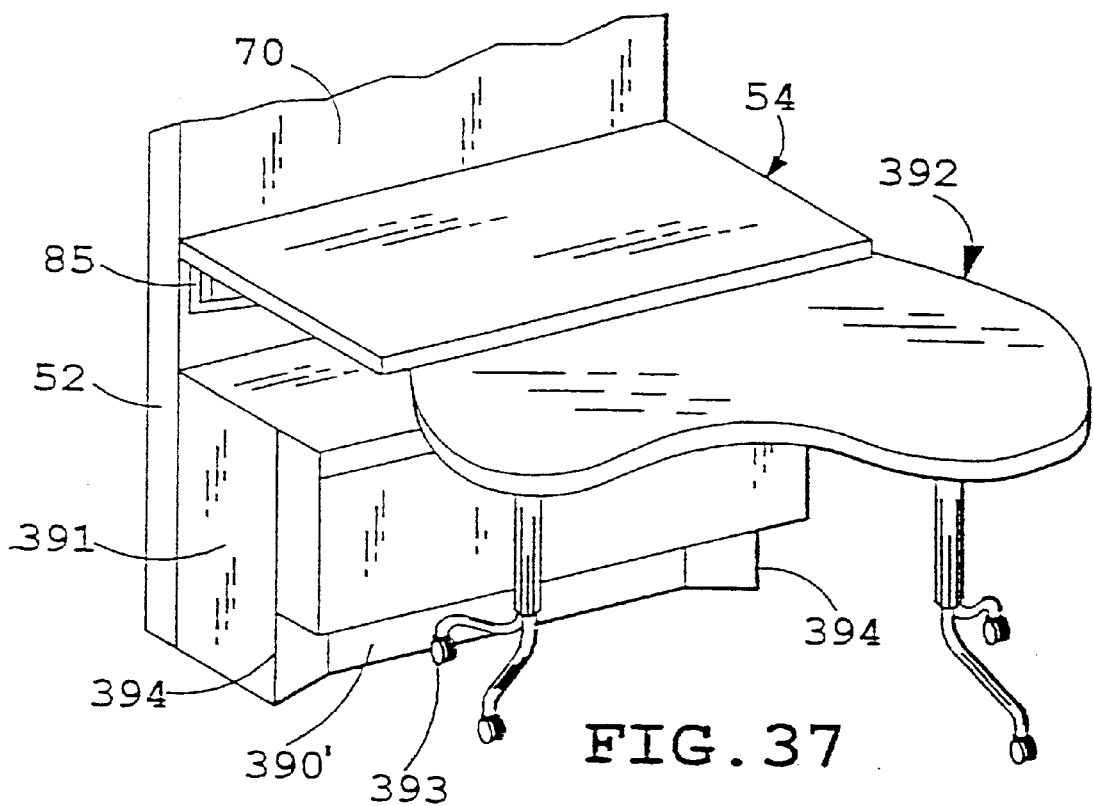
FIG. 37 is a fragmentary perspective view of the modified under shelf storage unit shown in FIG. 36 including the interaction of a furniture unit/table with the configured floor-adjacent recess.

Notably, the floor-adjacent recess of the under shelf lower storage can be shaped to control movement of the table or furniture unit as it is moved along the partition panel parallel the datum shelf. For example, in FIG. 36, the floor-adjacent recess 390 of lower storage unit 391 is formed by a concavely-shaped surface 390' under the drawer 391'. When table 392 is positioned against the partition panel 52 in a fully-nested position, the castors/feet 393 engage the surfaces on lower storage unit forming recess 390. As the table 392 is moved along the partition panel 52, for example toward a corner defined by perpendicular panels 51 and 52, the outwardly extending sides 394 kick table 392 away from the panel 52 so that the table 392 does not damagingly strike components in the corner, such as a keyboard support or the like (see FIGS. 1 and 13).

Thus, a system for subdividing a building space into work areas is provided that includes interconnectable partition panels, each having an internal frame with a plurality of horizontal frame members located at predetermined heights. The horizontal frame members each have at least one horizontal row of slots, and at least one of the horizontal frame members is located slightly above an optimal worksurface height for supporting an interactively used datum shelf. Furniture components are attachable to the horizontal frame members at selected horizontal positions, including the datum shelf, an under shelf storage unit and an upper storage unit. A mobile furniture unit is provided having a worksurface located at an optimal worksurface height, the worksurface having a cantilevered edge section that can be extended partially under the datum shelf at a selected optimal depth for coordinated and efficient use of the datum shelf concurrent with using the worksurface. The furniture construction is constructed to maximize floor space and storage within an office area or work area while maintaining a minimum footprint. Further, the furniture construction allows user reconfiguration, and provides for maximum work efficiency and adaptability. Also, the work area defined by the instant construction is noticeably open and spacious, even where the actual work area size is less than traditional office sizes, such as where the work area size is equal to or less than 6 feet by 6 feet.

Modification

An expandable/contractible furniture component 400 (FIGS. 38 and 39) is shown attached to a partition system 401. Partition system 401 (FIGS. 1–3 and 59) includes a plurality of partitions 402 connected together to form a main run of panels or "spine wall" and a plurality of additional partitions 403 or "fin walls" connected perpendicularly to the spine wall to form a plurality of offices having non-uniform sizes. The details of exemplary partitions of partition system 400 are shown in FIGS. 1–4 and 59–66 in this disclosure, and also in application Ser. No. 08/767,814, filed Dec. 17, 1996, entitled PARTITION CONSTRUCTION, the entire contents of which are incorporated herein by reference. Partitions 402 and 403 include removable cover panels 404, which are shown in present FIGS. 1–3 and 59, but which are only partially shown in FIG. 38 to better show the relationship and connection of furniture component 400 to the partition frames of the partitions 402 and 403.

The partitions frames of partitions 402 and 403 (FIG. 59) include uprights 405 and 406, and further include a plurality of horizontal frame members, such as bottom horizontal frame member 407, beltline-wide horizontal frame member 408, and above-worksurface horizontal frame member 409. The horizontal frame members 407–409 include horizontal rows of slots, such as slots 410 and 411 in the beltline frame member 408.

Figure 10C:
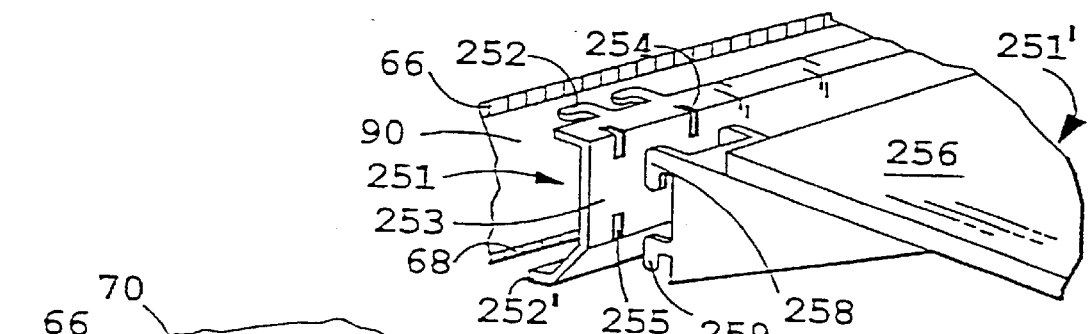
Figure 10D:
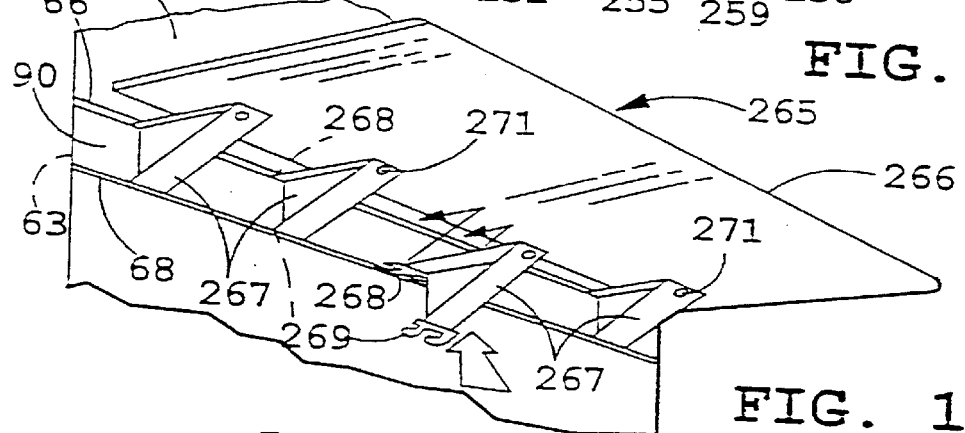
Figure 10F:
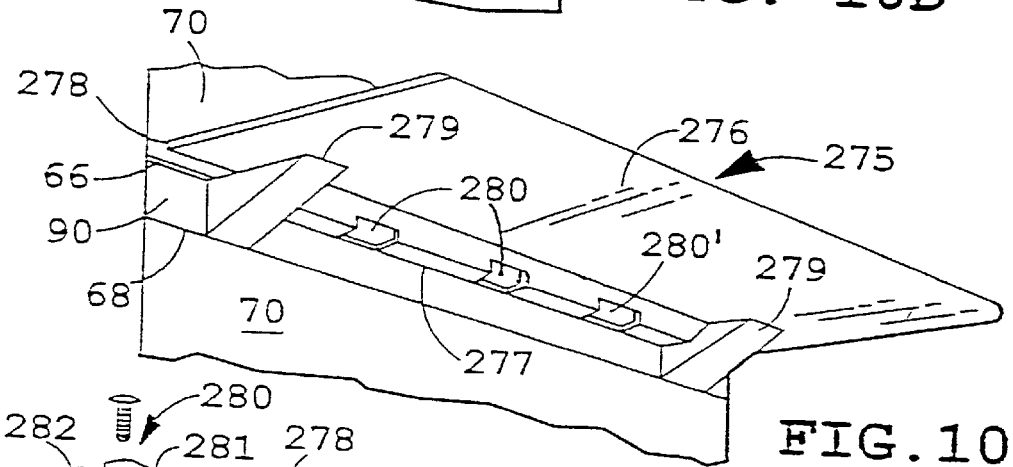
Figure 10G:
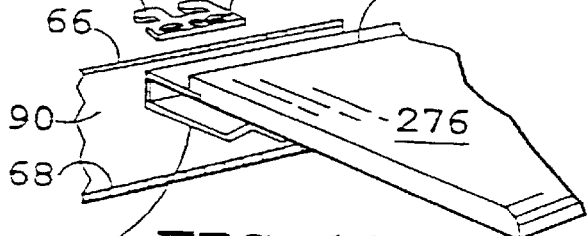
Figure 10E:
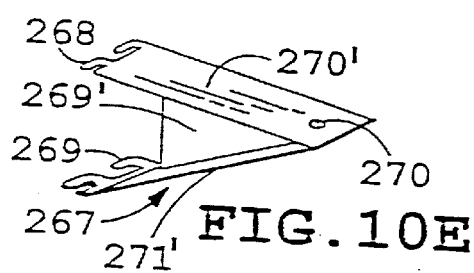
Figures 38, 39:
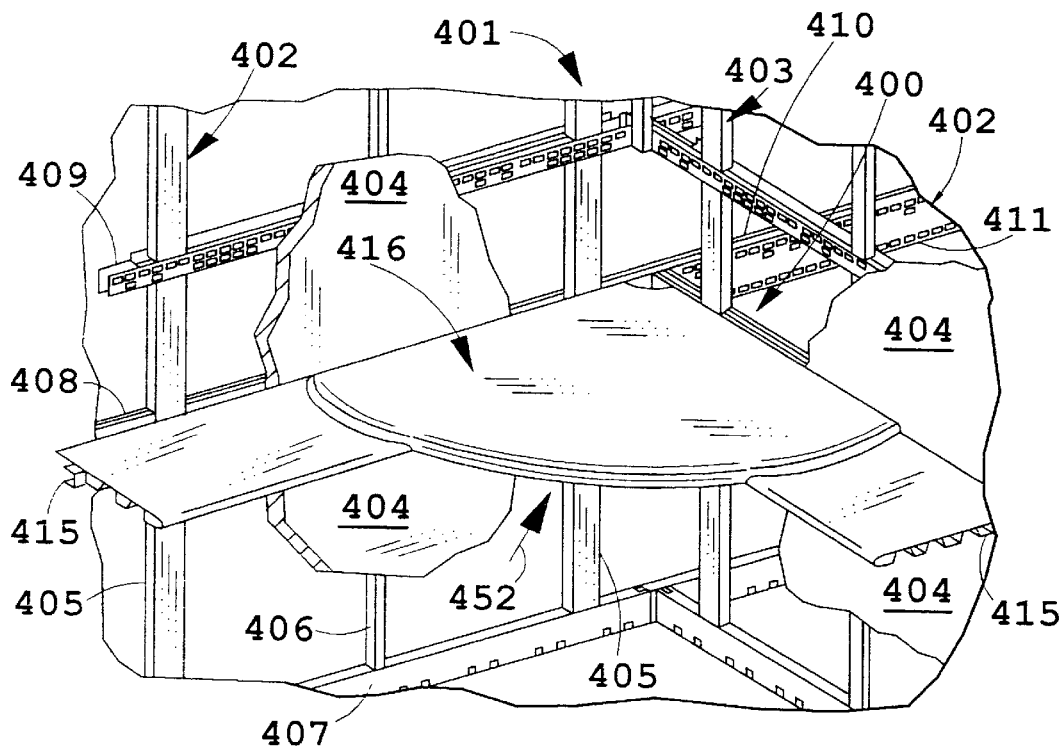
FIG. 38 is a perspective view of a modified corner shelf configured to telescopingly receive linear shelves at its corners, the cover panels for the partition being broken away to better show the partition frame.
FIG. 39 is a bottom perspective view of the corner shelf and the partition system shown in FIG. 38.
Figure 57:
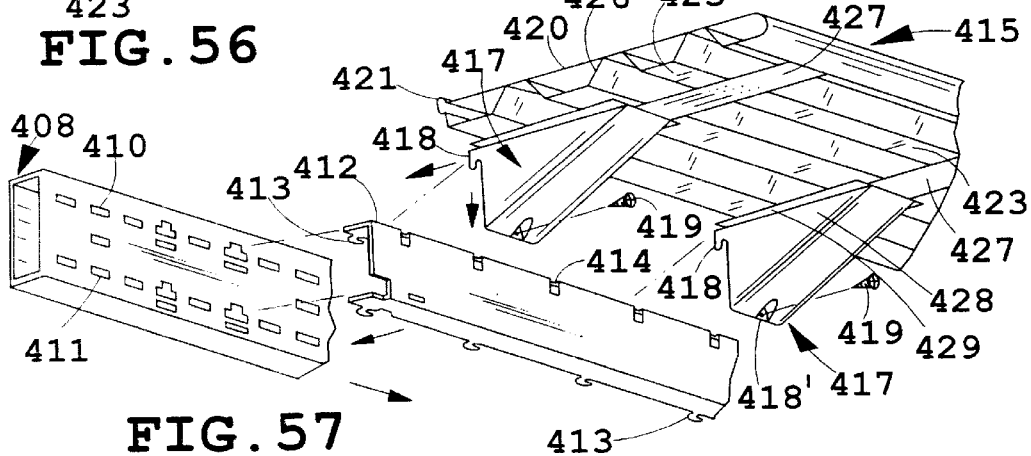
FIG. 57 is an exploded fragmentary view showing attachment of a linear shelf to the partition system of FIG. 38.

A C-shaped attachment channel 412 (FIG. 57) includes laterally extending hooks 413 configured to perpendicularly and then horizontally/laterally engage slots 410 and 411 of beltline frame member 408, and further includes a plurality of spaced apart apertures 414 along its upper outer edge. The present expandable/contractible furniture component 400 (FIG. 38) includes linear shelves 415 and corner shelf 416 each having cantilevered triangular supports 417 with hooks 418 for selectively engaging apertures 414. The triangular supports 417 further include apertured tabs 418' at their lower edges for receiving screws 419 that fasten/fix the triangular support 417 to the channel 412 to prevent accidental disengagement. The cover panels 404 attached to partitions 402 and 403 abut the top and bottom of C-channel 412. It is noted that a cantilevered shelf arrangement similar to the arrangement of FIGS. 38, 39 and 57 is shown in FIGS. 10B and 10C.

The present modification focuses on telescopingly expandable/contractible furniture components, such as shelves or worksurfaces, that can be expanded to fill a dimension of an office space, where the dimension is not known at the time of constructing the furniture component, or where the office size is likely to change. It is noted that the broad concept of telescopingly expandable/contractible corner shelves is shown in FIGS. 11–13 and 21–26. It is contemplated that the present invention includes partition-attached furniture components, as well as unattached and freestanding furniture, such as expandable/contractible desks, bookshelves, and other items.

Figure 58:
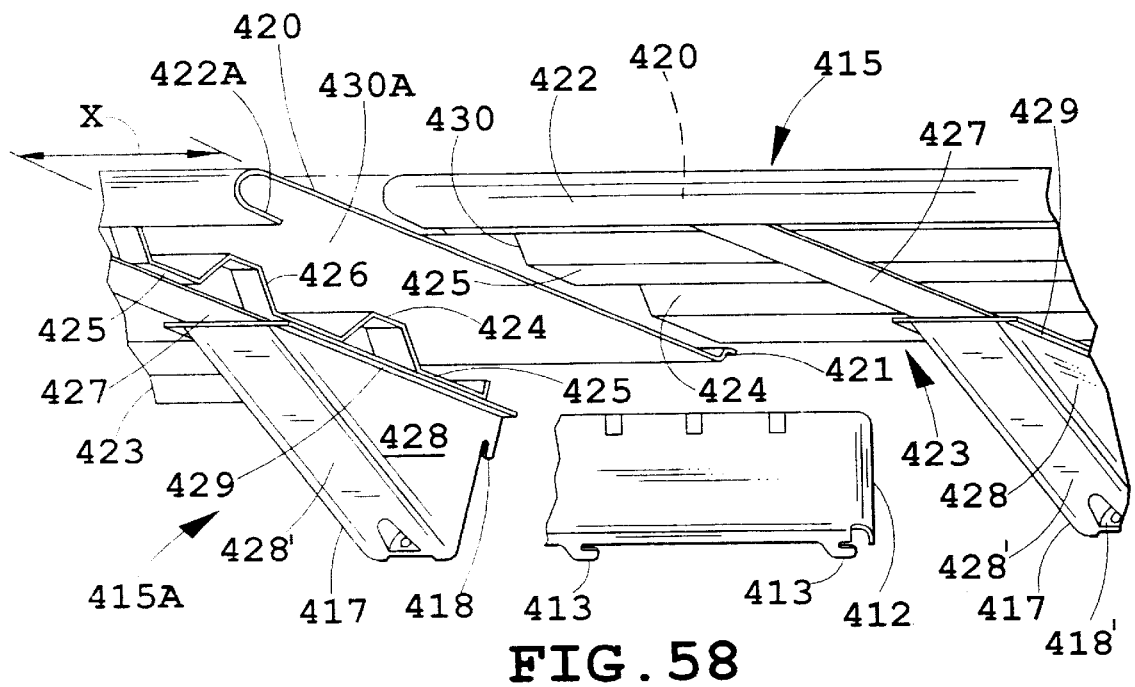
FIG. 58 is an exploded view of a pair telescopingly engageable, slip-fit, mating in-line shelves.
Figure 52:
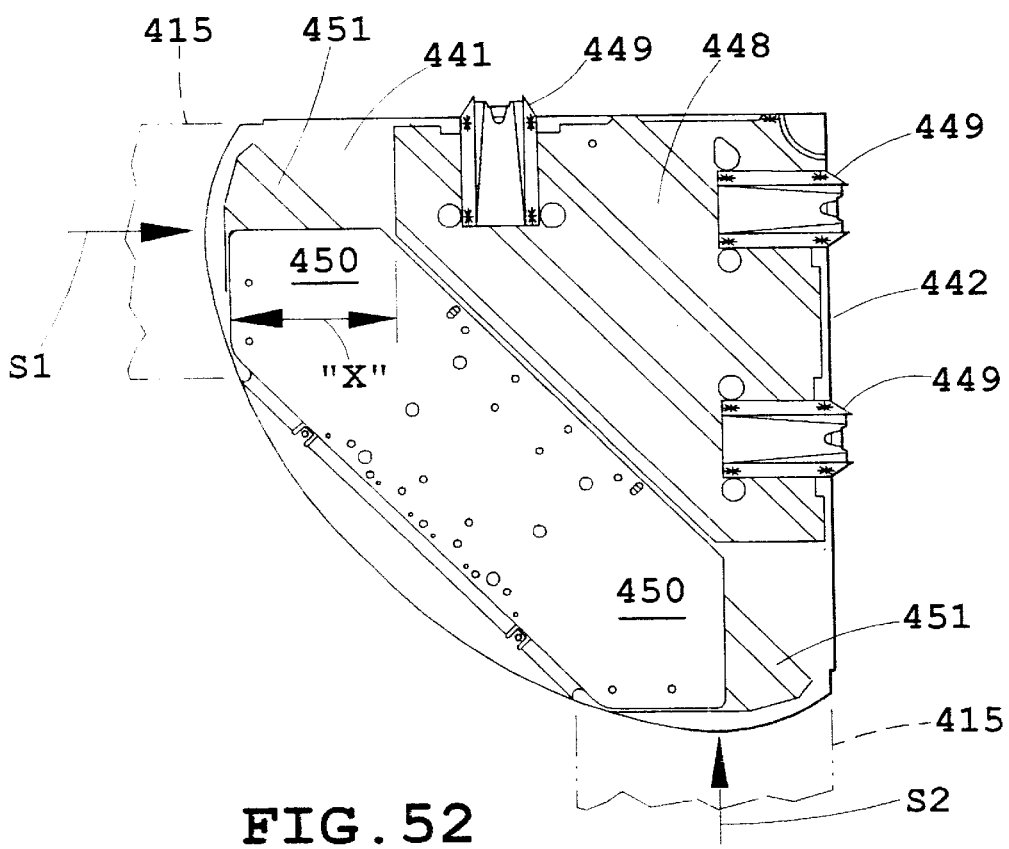
FIG. 52 is a bottom view of the corner shelf shown in FIG. 48.

Linear shelves 415 (FIG. 58) include a top sheet formed into a flat top or worksurface 420, a curvilinear front edge 422, and a lipped rear edge 421. A reinforcement 423 includes corrugated flat sections with top-engaging sections 424 and downwardly spaced bottom sections 425, interconnected by angled sections 426. The top sheet and/or the reinforcement can be stamped, break-press-formed, roll-formed or otherwise formed from conventional processes. Triangular supports 417 include side walls 428 with attachment flanges 429. The flanges 429 are configured to fit mateably against angled sections 426 and to be welded to reinforcement bottom sections 425. The side walls 428 are interconnected by a transverse wall 428' having radiused bend lines. Straps 427 are formed integrally as part of the supports 417 where needed, and are also welded to the reinforcement bottom sections 425. Reinforcement 423 is adhered or otherwise secured to top 420 in a manner preventing objectionable distortion to top 420.

Where desired, a pair of shelves 415 and 415A (FIG. 58) are constructed to telescopingly engage. In shelf 415A, the reinforcement 423 is cut short of the end 430A of its top 420. Also, the top 420 is shaped to telescopingly engage and overlappingly receive the free end 430 of the shelf 415, with the top 420 of shelf 415 sliding under top 420 of shelf 415A. The shelves 415 and 415A slidingly engage up to the dimension "X", which is basically the distance of the overhang of top 420 beyond its reinforcement 423. A plastic lip (not specifically shown) can be placed on the edge of top 420 at end 430A if desired, or the edge can be rounded/deburred to prevent marring or damage during assembly of shelf 415A to shelf 415.

In one method of assembly (FIG. 58), the C-channels 412 are first attached to a partition frame 402, and shelf 415 is then attached to its C-channel 412. Shelf 415A is thereafter attached by placing its nose 422A over the nose 422 of shelf 415. The shelf supports 417 of shelf 415A are then selectively engaged in the apertures 414 of its C-channel 412.

Figure 58A:
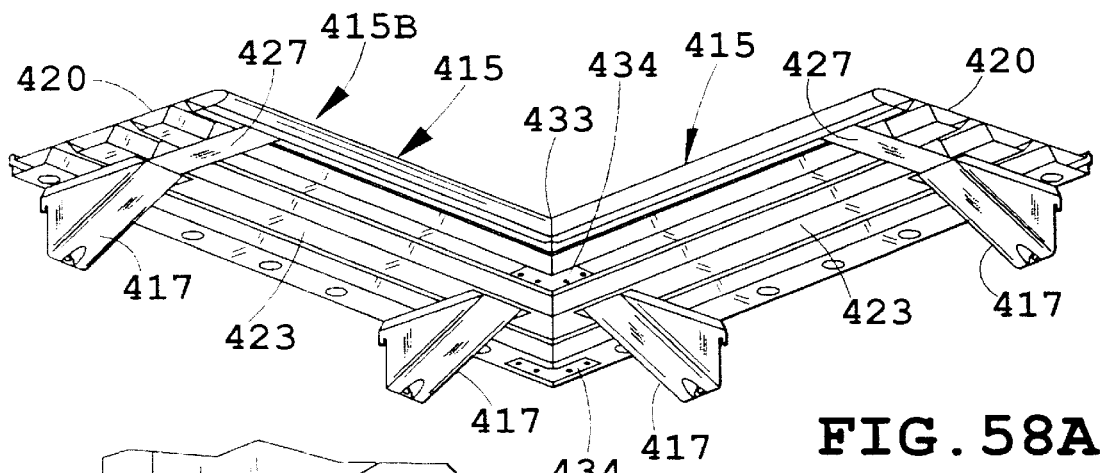
FIG. 58A is a bottom perspective view of an L-shaped corner shelf.
Figure 58B:
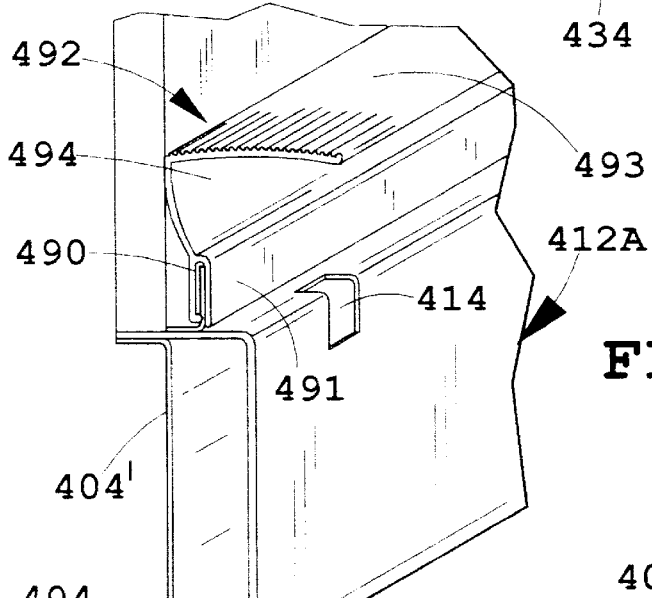
FIGS. 58B and 58C are fragmentary perspective and side views of a modified C-shaped support bracket having a flexible flange for covering a wireway passageway at a rear of the shelf, FIG. 58C showing the shelf.
Figure 58C:
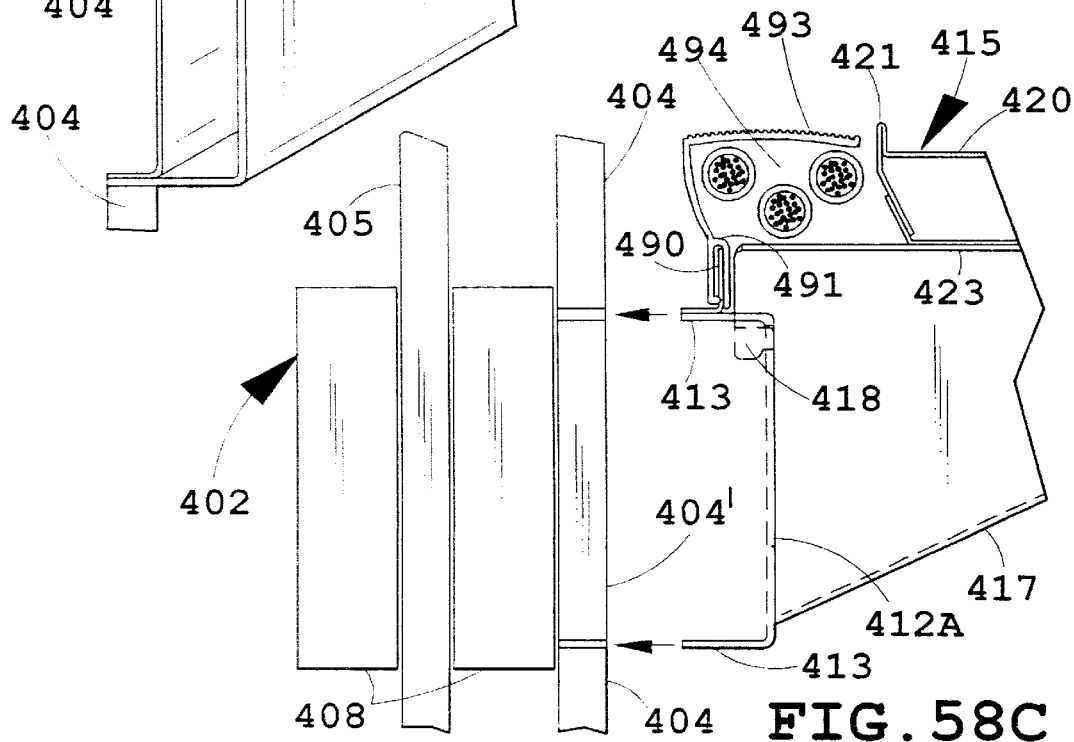

An L-shaped corner shelf 415B (FIG. 58A) includes a pair of shelf sections 415 cut at 45° at one end 433 and welded together to form a rigid L-shaped corner shelf (in plan view). The shelf 415B includes a formed sheet forming a top 420, a reinforcement 423 for supporting the top sheet, and a plurality of cantilever triangular supports 417. Planar L-brackets 434 interconnect the two shelve sections 415 at the angled-cut ends 433.

A modified C-channel 412A includes a flange 490 for receiving a clip section 491 of a flexible extrusion 492. A curvilinear flange 493 extends upwardly from clip section 491 and forwardly over a wireway passageway 494 formed at the rear of shelf 415 above triangular supports 415.

Figure 40:
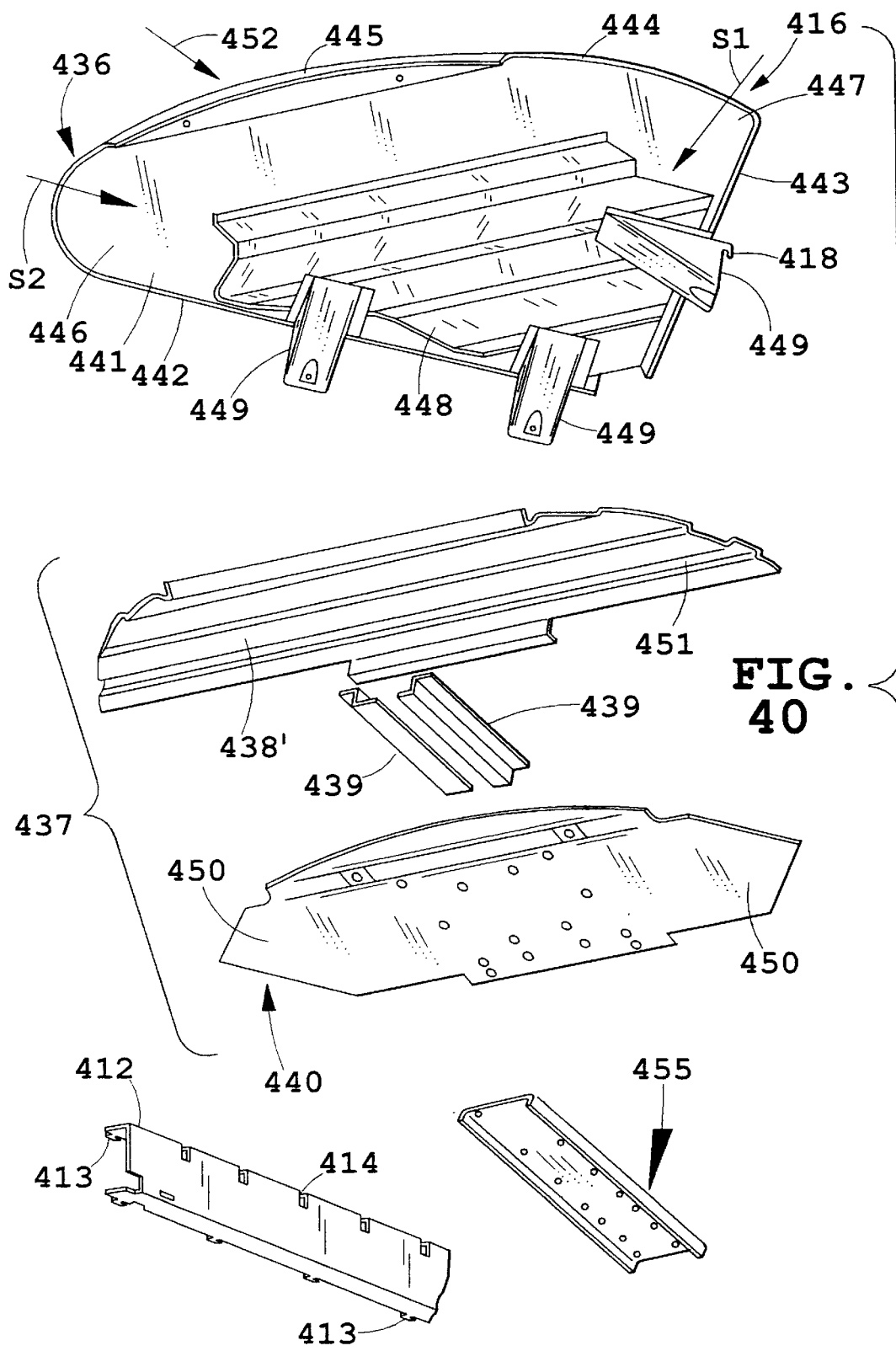
FIG. 40 is an exploded bottom perspective view of the corner shelf shown in FIG. 38.
Figure 41:
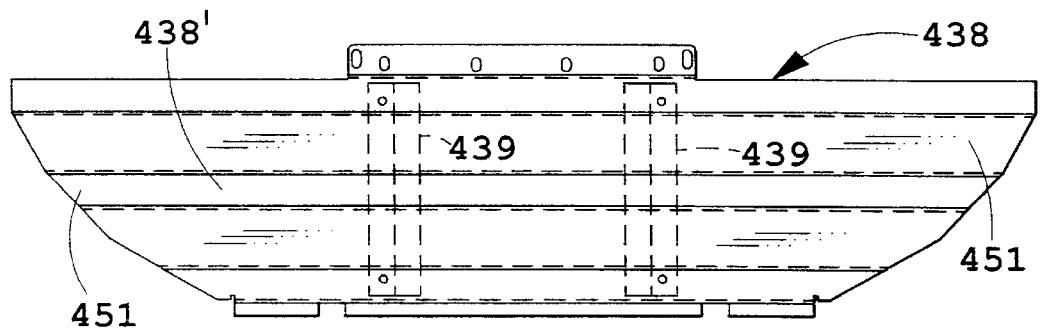
FIG. 41 is a plan view of the bottom reinforcement shown in FIG. 40.
Figure 42:
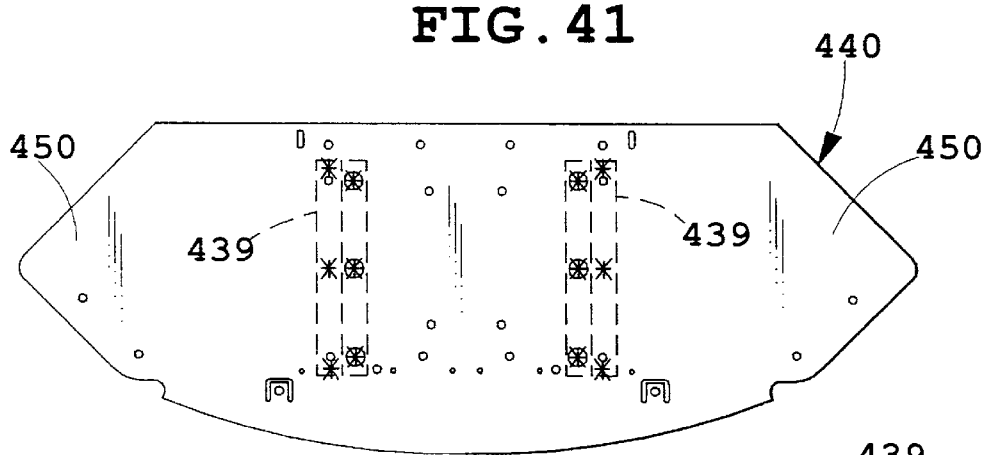
FIG. 42 is a plan view of the bottom plate shown in FIG. 40.
Figure 43:
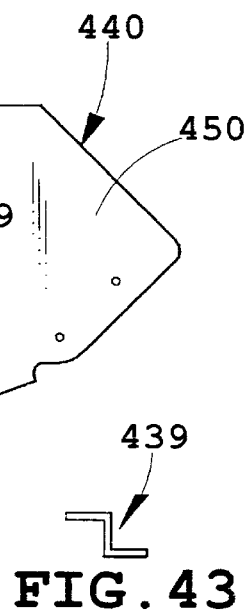
FIG. 43 is an end view of a Z-bracket shown in FIG. 40 for connecting the bottom reinforcement of FIG. 41 to the bottom plate of FIG. 42.
Figure 47A:
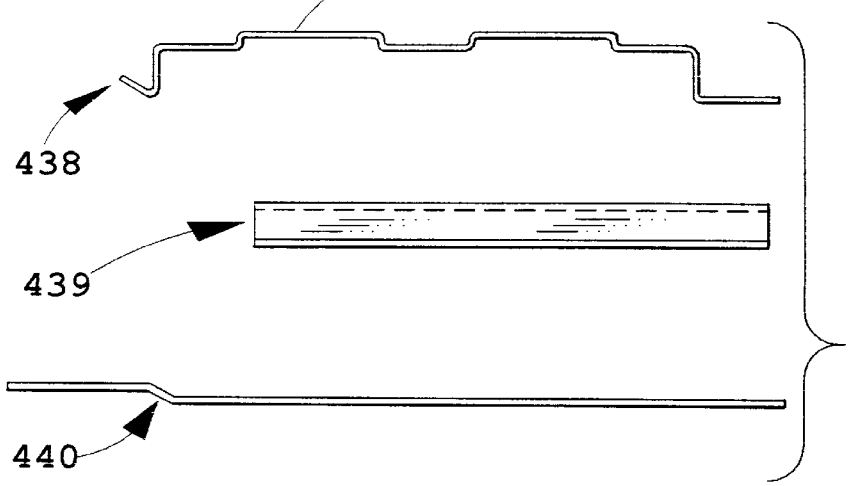
FIG. 47A is an exploded view of FIG. 46.
Figure 44:
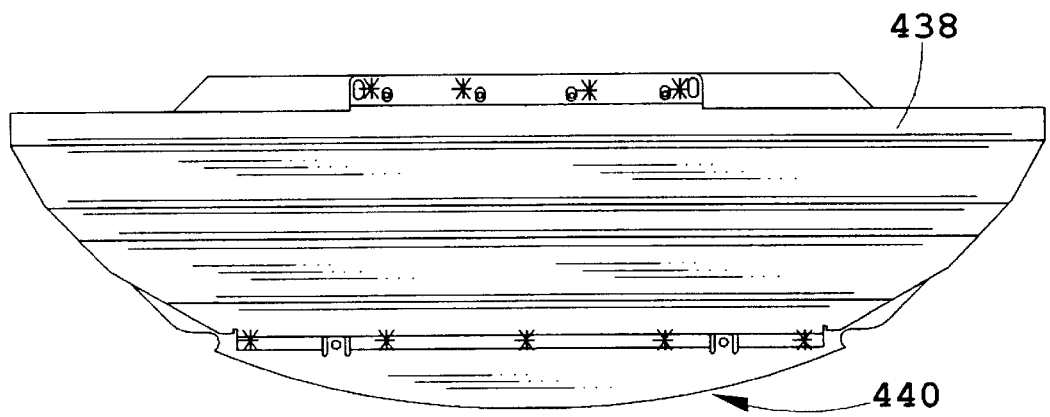
FIGS. 44–47 are top, front, bottom, and side views of an assembly including the bottom reinforcement, the bottom plate, and the Z-brackets of FIGS. 41–43.
Figure 45:
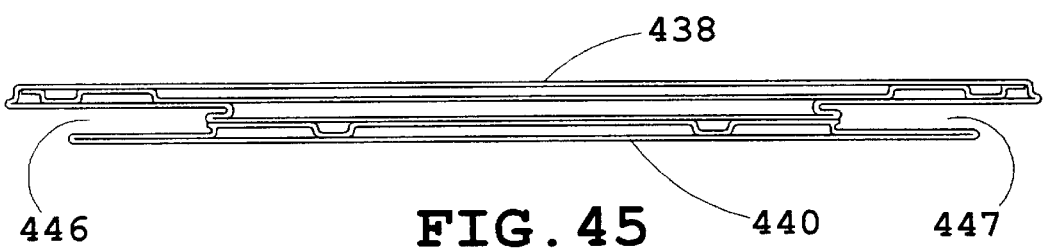
Figure 46:
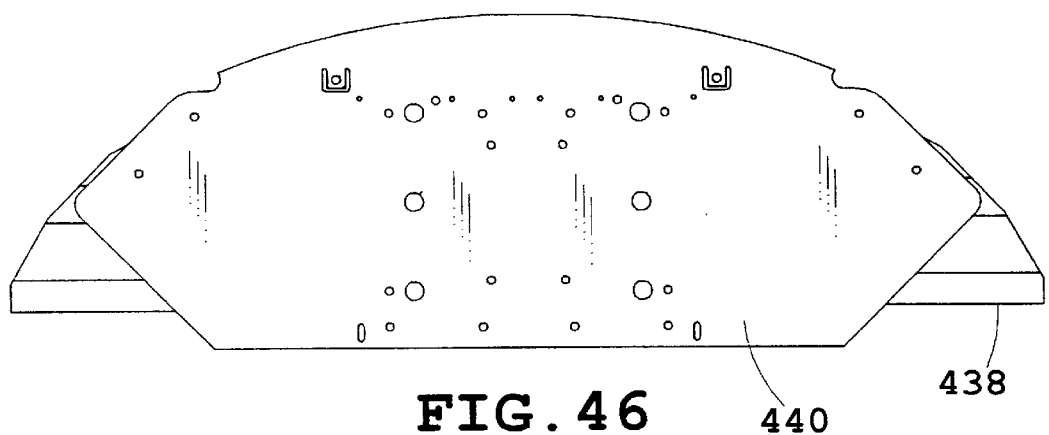
Figure 47:
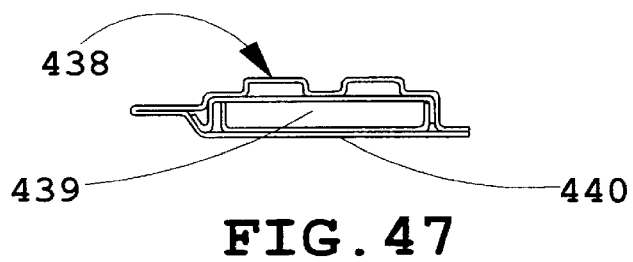
Figures 48, 49:
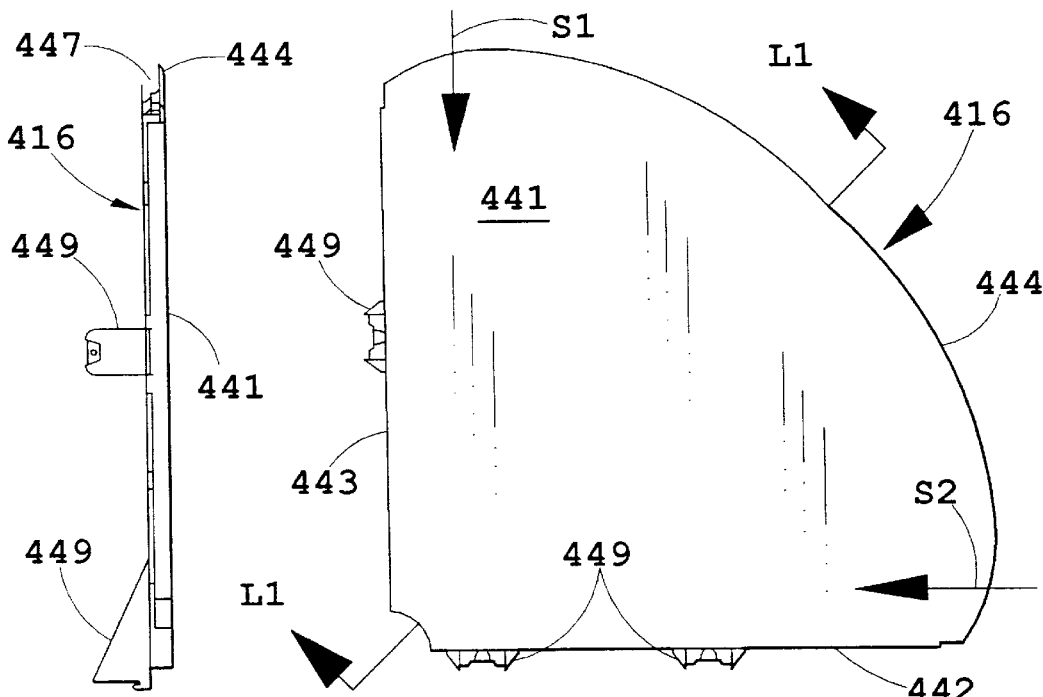
FIG. 48 is a plan view of the corner shelf shown in FIG. 38.
FIGS. 49 and 50 are side views of the orthogonal sides of the corner shelf shown in FIG. 48.
Figure 50:
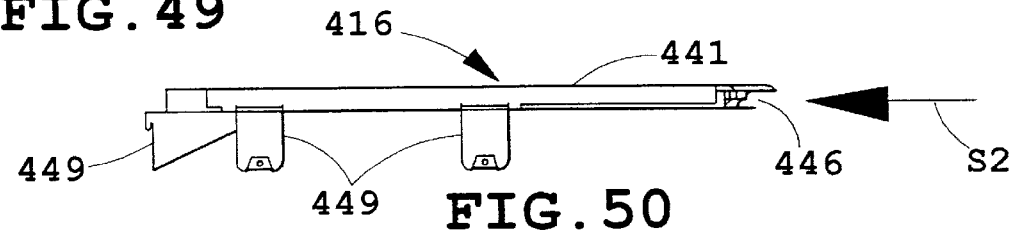
Figure 50A:
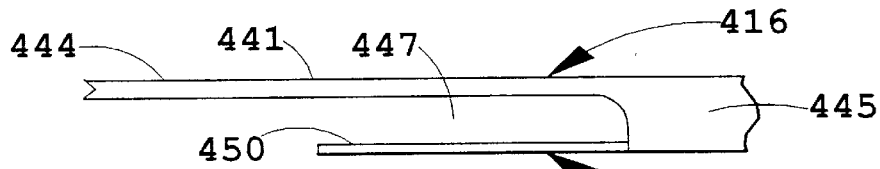
FIG. 50A is a fragmentary view of the shelf taken in direction S2 in FIG. 48.
Figure 51:
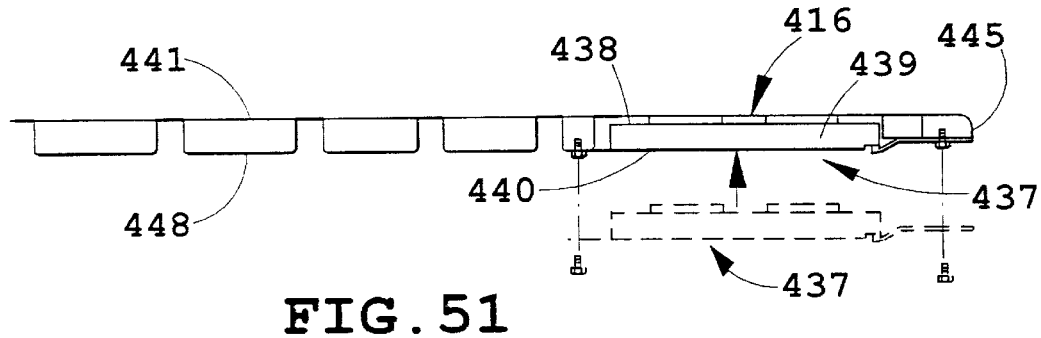
FIG. 51 is a cross-sectional view taken along the line LI—LI in FIG. 48.

Corner shelf 416 (FIG. 40) has a top assembly 436 and a beam assembly 437. Beam assembly 437 includes a beam top 438 (FIG. 41 and 47A), a pair of Z-shaped stiffeners 439 (FIGS. 43 and 47A), and a beam bottom 440 (FIG. 42 and 47A). The components 438–440 are sandwiched together and spot welded to form beam assembly 437 (FIGS. 44–47A).

Figures 53, 54:
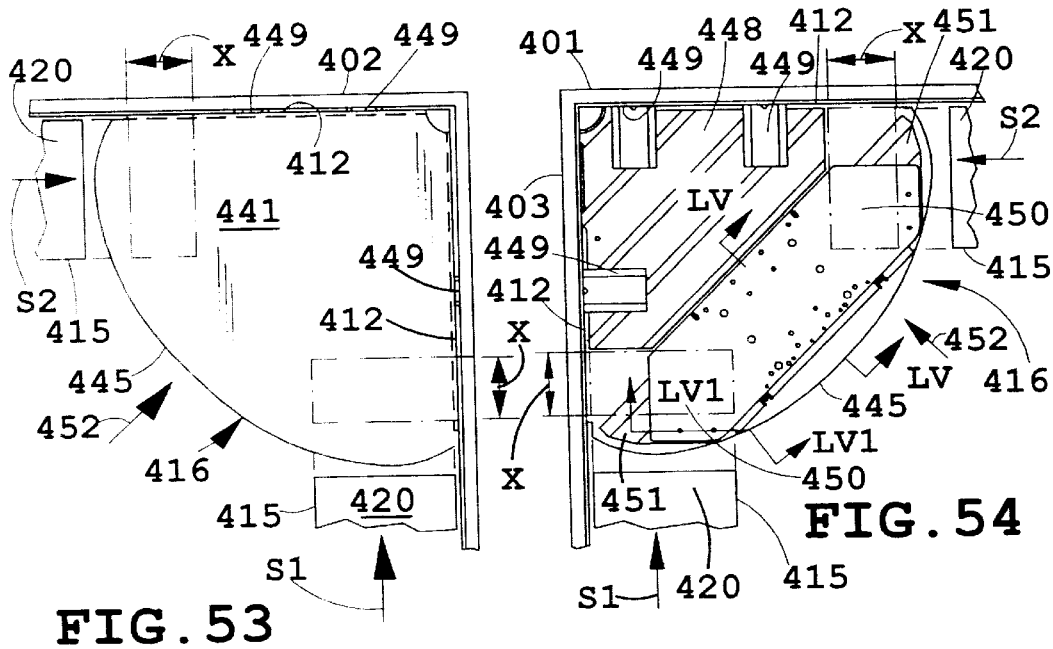
FIGS. 53 and 54 are top and bottom views of the corner shelf and partition system shown in FIG. 38.
Figure 56:
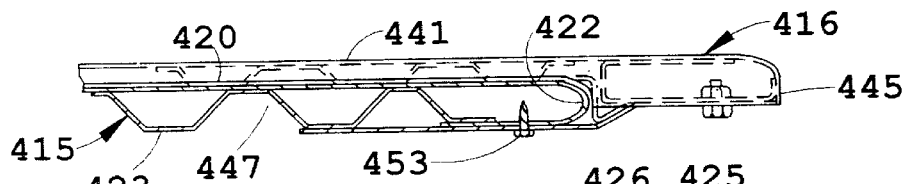
FIG. 56 is a cross-sectional view taken along the line LVI—LVI in FIG. 54.

The top assembly 436 (FIG. 40) includes a top sheet 441 with orthogonal side edges 442 and 443 and a rounded arcuate edge 444. A nose flange 445 is formed on rounded edge 444, and defines orthogonal throats/openings 446 and 447 for receiving an end of the linear shelf 415 in directions S1 and S2. (See FIGS. 53, 54, and 56.) A corrugated reinforcement 448 (FIG. 40) is attached to top sheet 441 at a corner thereof formed by edges 442 and 443. Three angular supports 449 are attached to corrugated reinforcement 448, two being on one side and the third being on the other straight side. Supports 449 are substantially similar to shelf supports 417 previously described, and are configured to engage a C-channel 412 in the manner also previously described in regard to supports 417.

Figure 55:
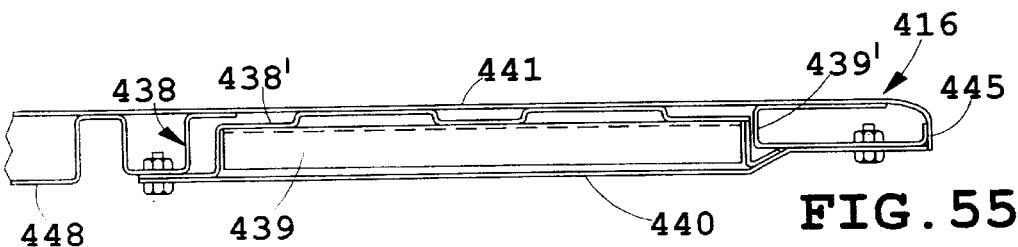
FIG. 55 is a cross-sectional view taken along the line LV—LV in FIG. 54.

The beam top 438 of beam assembly 437 (FIG. 40) is corrugated and is stamped (or roll-formed), but the depth of its corrugated section 438' is considerably less than the vertical height of top corrugated reinforcement 448 (FIG. 55). The stiffeners 439 and 439' (FIG. 55) space the ends 450 (FIG. 40) of lower plate 440 below the ends 451 of reinforcement 438 to define the openings 446 and 447 (see FIGS. 45, 53, and 54) therebetween. The openings 446 and 447 provide two functions. The openings 446 and 447 adjustably receive shelves 415 (FIGS. 53 and 54) and allow them to be inserted into beam assembly 437 up to a maximum adjusted distance "X". The stiffeners 439 and 439' are configured to allow beam assembly 437 to be moved diagonally (at 45°) into the corner defined by partitions 402 and 403 after the shelves are attached to partitions 402 and 403. Once the beam assembly 437 is in position in the corner, the top assembly 436 can be set onto the beam assembly 437 while engaging the support hooks 418 in C-channels 412. Once the shelves and assemblies 436 and 437 are positioned in their selected positions, screws 453 (FIG. 56) are extended through holes 454 in bottom plate 440 and into reinforcement 423 of respective linear shelves 415 (FIG. 56) to secure the linear shelves 415 to corner shelf 416. Additional screws are installed to secure the beam assembly 437 to the top assembly 436 and to secure the triangular supports 449 to the C-channels 412. Notably, the ends 450 and 451 of beam assembly 437 define a space that closely receives it respective linear shelf 415, such that this construction stabilizes the shelf assembly on the partitions.

A track 455 (FIGS. 1, 13, and 39) is optionally secured under bottom plate 440. Track 455 is configured to slidably support an adjustable keyboard support arm thereon.

Figure 59:
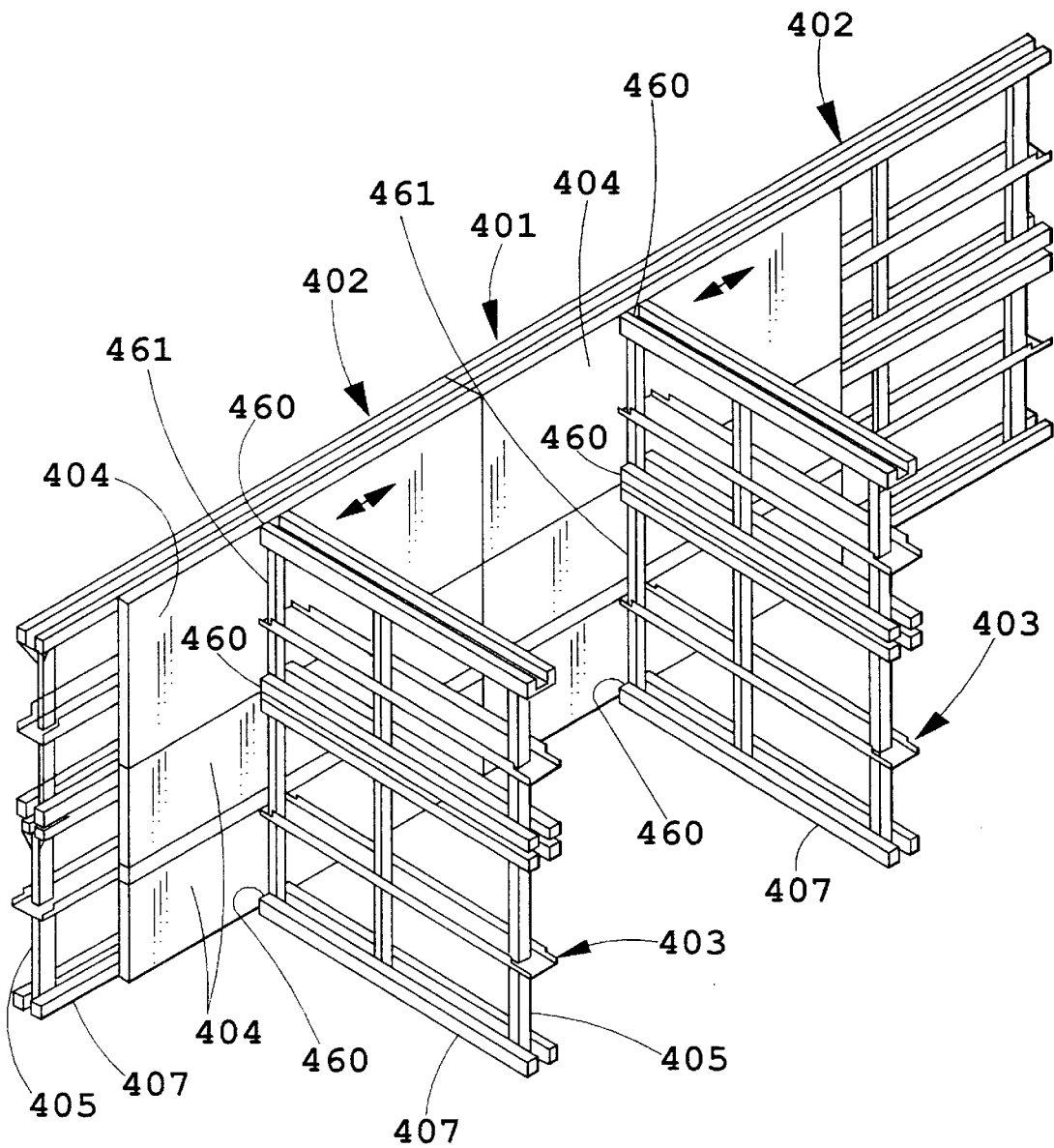
FIG. 59 is a perspective view of a fin-wall partition connected off-module to a spine-wall partition to form an office with corners.
Figure 60:
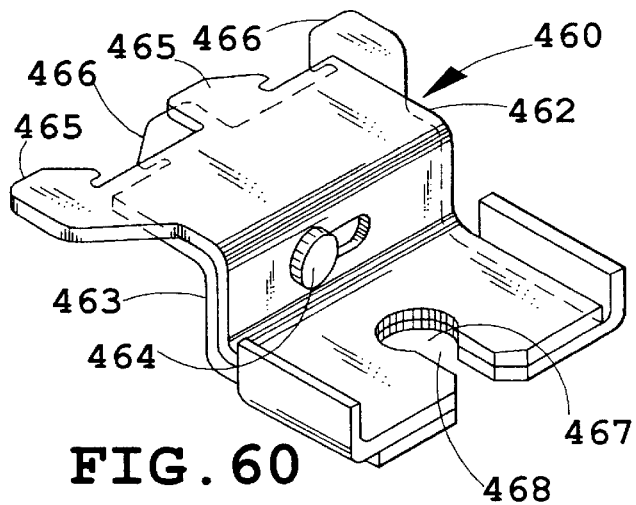
FIG. 60 is an off-module connector bracket for connecting a fin-wall partition to a spine-wall partition.
Figure 61:
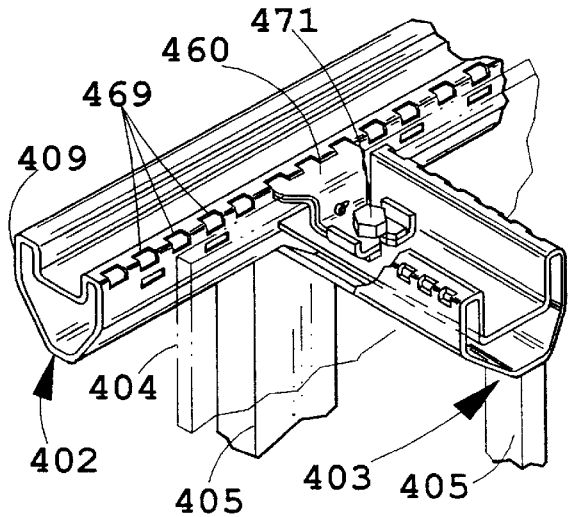
FIG. 61 is a perspective view showing the bracket of FIG. 60 connecting a fin-wall partition off-module to a spine-wall partition.
Figure 62:
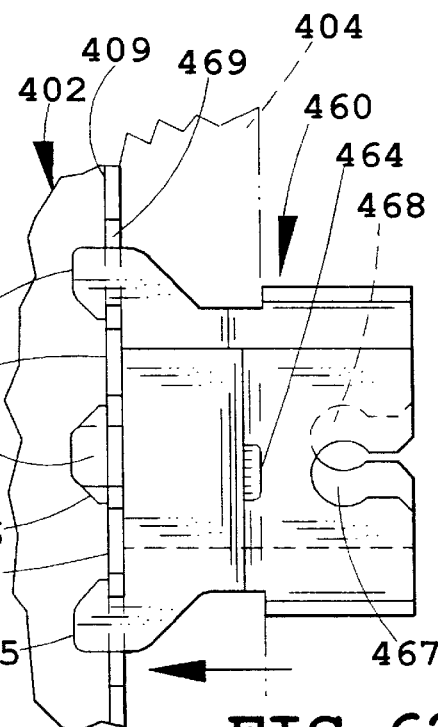
FIGS. 62 and 63 are fragmentary top view showing the bracket of FIG. 60 connecting a fin-wall partition to a spine wall as shown in FIG. 61, FIG. 62 showing the bracket in an installation/insertion position, and FIG. 63 showing the bracket in an interlocked/retaining position.
Figure 63:
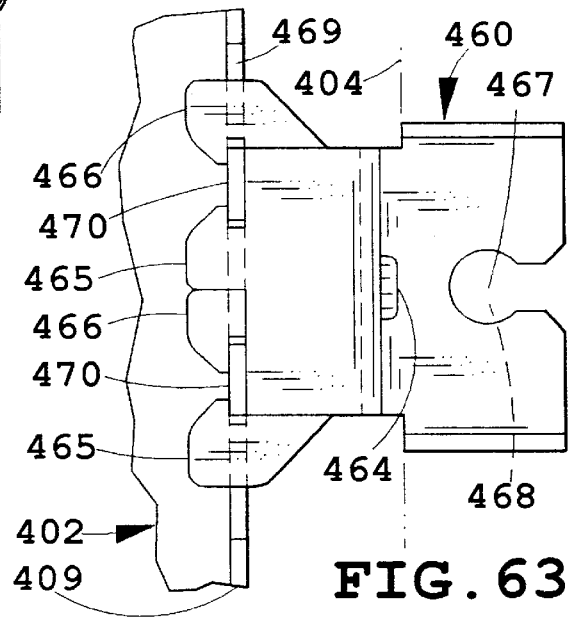
Figure 64:
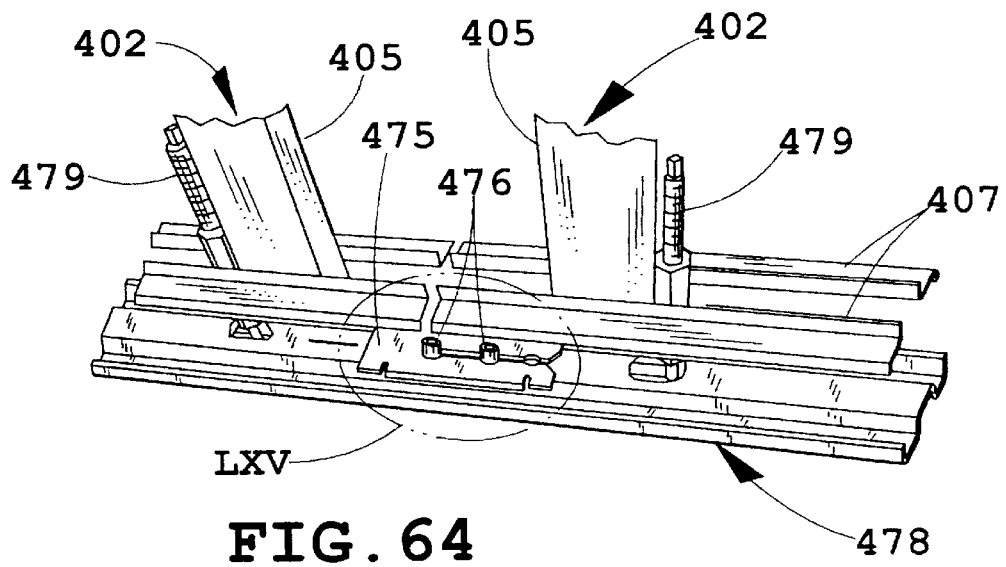
FIG. 64 is a perspective view showing in-line connection of one spine-wall partition to another spine-wall partition at its base.
Figure 65:
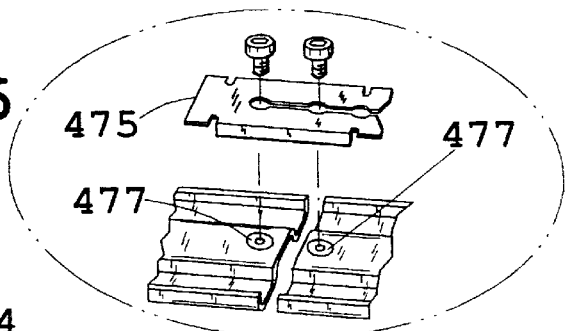
FIG. 65 is an exploded perspective view of the circled area in FIG. 64.

Preferred partition systems are shown in detail in application Ser. No. 08/687724, filed Jul. 26, 1996, and application Ser. No. 08/579614, filed Dec. 26, 1995, previously incorporated by reference. Nonetheless, a brief description is provided herein for a present understanding, and in particular to show the adjustability of the present partitions, whereby the off-module panel can be adjusted at unitary increments (such as one inch increments) on the spine-wall partition. FIG. 59 shows partitions 402 and 403 interconnected together with offmodule connecting brackets 460, fin-wall partitions 403 having vertical side edges 461 abutting spine-wall partition 402 at off-module location on partition 402 between the vertical side edges of partition 402. The off-module connector bracket 460 is shown in detail in FIG. 60. Bracket 460 includes a pair of slidably engages plates 462 and 463 held together with one or more rivets 464. The plates 462 and 463 include opposing hooks 465 and 466, respectively, at one end, and include alignable slots 467 and 468, respectively, at another end. In an insertion/installation position (FIG. 62), the hooks 465 and 466 are extendable into apertures 469 (similar to slots 410 and 411, FIG. 59). However, when plates 462 and 463 are slid to align slots 467 and 468 (FIG. 63), the hooks 465 and 466 spread apart to securely and fixedly engage the flanges 470 of partition 402 on the horizontal sides of apertures 469. With slots 467 and 468 aligned, a screw 471 (FIG. 61) is extended through slots 467 and 468 into a nut welded at location 472 in partition 403. Thus, slots 467 and 468 cannot be misaligned unless screw 471 is removed.

Figure 66:
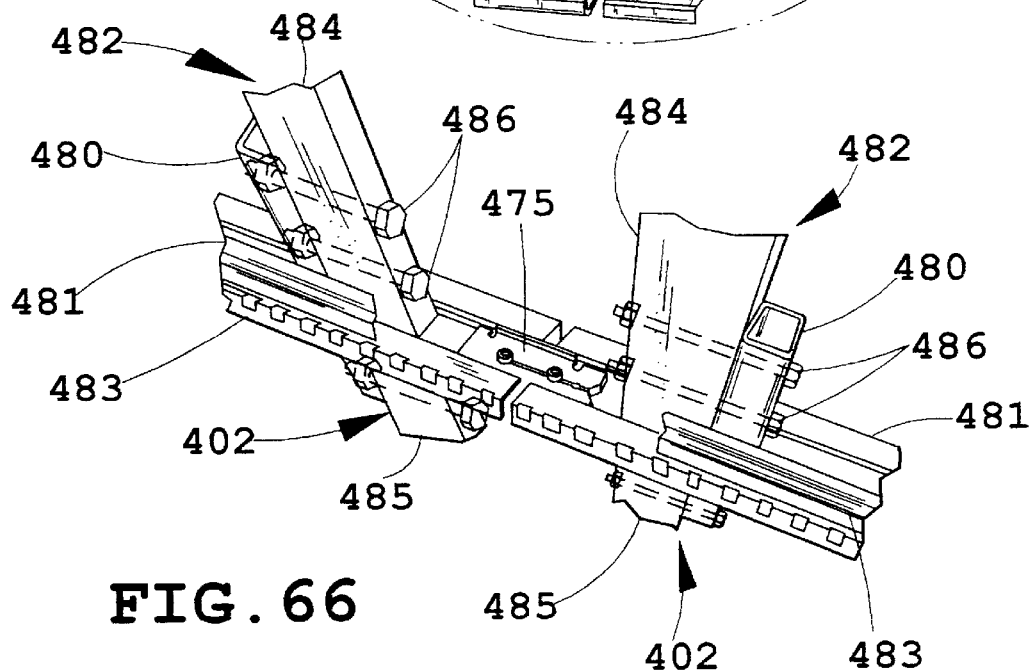
FIG. 66 is a fragmentary perspective view showing in-line connection of one spine-wall partition to another spine wall at its top, FIG. 66 also showing stacker partitions connected with stacker brackets to tops of the spine-wall partitions.

Spine wall partitions 402 (FIGS. 64–66) are held together by an in-line connector bracket 475 that spans between in-line, abutting partitions 402. A screw 476 engages a welded nut 477 in each partition 402 at a floor level (FIG. 64) and also at one or more higher levels (FIG. 66). At the floor, it is contemplated that floor channels 478 will fixedly engage and support levelers 479 on partitions 402, and that in-line connector brackets 475 will secure adjacent floor channels 478 together. However, it is contemplated that in-line connectors could engage bottom frame members on the partitions as well.

It is noted that partitions 402 can be stacked (FIGS. 66 and 59), and for this purpose a tubular stacker bracket 480 (FIG. 66) is provided. Stacker bracket 480 extends through the bottom horizontal frame member 481 of stacker frame 482 and through the top horizontal frame member 483 of base frame 402. Stacker frame 482 and base frame 402 are structurally very similar, and each include uprights 484 and 485, respectively. The bracket 480 includes apertures for receiving bolts 486 to secure the brackets 480 to the uprights 484 and 485, thus securing stacker frame 482 to a top of base partition 402.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An apparatus for subdividing a building space, comprising:
    a partition having a frame;
    a first furniture component attached in cantilever to said frame including a horizontally/laterally facing edge defining openings with side edges, the openings oriented in each of two different directions; and a second furniture component releasably attached in cantilever to said frame and configured for horizontal adjustment, the second furniture component having a matingly shaped end telescopingly engaging either one of the openings in the edge in a manner permitting adjustment therewith, whereby a total horizontal length of said first and second furniture components can be selectively adjusted on the partition on-site.

2. The apparatus defined in claim 1 wherein the first and second furniture components form a continuous shelf system.

3. The apparatus defined in claim 2 wherein the first furniture component includes a corner shelf.

4. The apparatus defined in claim 3 wherein the second furniture component includes a linear shelf.

5. The apparatus defined in claim 4 wherein the corner shelf defines at least top and bottom sides of the one opening 112 receiving the matingly shaped end of the linear shelf.

6. The apparatus defined in claim 5 wherein the linear shelf is fastened to the corner shelf after the linear shelf is adjusted to a desired position relative to the corner shelf so that the corner shelf and linear shelf have a net length equal to a predetermined dimension on the partition.

7. The apparatus defined in claim 6 including a keyboard support track attached to the corner shelf that is adapted to support a computer keyboard thereon.

8. The apparatus defined in claim 1 wherein the first and second furniture components each include triangularly-shaped cantilever brackets for supporting the first and second brackets in cantilever on the frame of the partition.

9. The apparatus defined in claim 6 wherein a first end of the first furniture component defines at least two sides of the one opening for receiving the matingly shaped end of the second furniture component.

10. The apparatus defined in claim 1 including a third furniture component adjustably engaging another one of the openings in the edge.

11. An apparatus for subdividing a building space, comprising:

a spine partition;

an off-module partition adjustably attached to the spine partition and oriented generally perpendicularly to the spine partition;

a first linear shelf adjustably attached to one of the spine and off-module partitions; and a corner shelf supported at a corner formed by the spine and off-module partitions, the corner shelf having a curvilinear outer perimeter edge that extends between the spine and off-module partitions and that defines an opening receiving the first shelf, the first shelf and the corner shelf having overlapping portions and the first shelf slidably engaging the corner shelf to define a variable total length along the one partition.

12. The apparatus defined in claim 11 wherein the first shelf is horizontally adjustable along the one partition between a plurality of discrete positions.

13. The apparatus defined in claim 12 wherein the corner shelf includes a top assembly and a bottom beam assembly that define top and bottom portions of the opening receiving an end of the first shelf.

14. The apparatus defined in claim 11 wherein the first shelf and the corner shelf each include cantilever brackets for engaging the one partition to support the first shelf and the corner shelf in a cantilevered position on the one partition.

15. An apparatus for subdividing a building space, comprising:

a spine partition;

an off-module partition adjustably attached to the spine partition and oriented generally perpendicularly to the spine partition;

a first shelf attached to one of the spine and off-module partitions; and a corner shelf supported at a corner formed by the spine and off-module partitions, the first shelf and the corner shelf having overlapping portions and the first shelf adjustably engaging the corner shelf to define a variable total length along the one partition, the corner shelf including a top assembly and a beam supporting the top assembly, said corner shelf defining a pair of generally orthogonal rear edges, the beam extending between the rear edges.

16. A furniture system comprising;

a spine wall;

a plurality of partitions each releasably connected to the spine wall including two partitions spaced apart to form an office therebetween, the partitions being adjustably connected to the spine wall so that a dimension between the partitions can be selectively adjusted to vary the size of the office; and a telescopingly contractible furniture article extending between the two partitions and constructed to expand and contract to fill the dimension between the two partitions to prevent undesired gaps between the partitions and ends of the furniture article.

17. The furniture system defined in claim 16 wherein the furniture article includes first and second components, at least one of which is attached to at least one of the first and second partitions.

18. The furniture system defined in claim 17 wherein the first component is attached to the one partition and comprises a first shelf.

19. The furniture system defined in claim 18 wherein the second component comprises a second shelf attached to the one partition and constructed to adjustably engage the first shelf.

20. The furniture system set forth in claim 18, wherein:

said spine wall includes a plurality of interconnected first partitions.

21. A shelf construction for attachment to a partition, comprising:

an elongated top sheet forming a planar top surface, a front edge, and a rear edge;

a reinforcement attached to a bottom of the elongated sheet for supporting the sheet, the reinforcement being characterized by having a constant cross-section defining a plurality of longitudinally extending accordion-like corrugations with top sections supporting the top sheet and bottom sections spaced vertically from the top sections; and a plurality of cantilever brackets extending transversely of said corrugations, said cantilever brackets attached to the bottom sections and extending laterally rearward from the rear edge for engaging and supporting the shelf construction on a partition.

22. The shelf construction defined in claim 21 wherein the cantilever brackets include straps interconnecting the bottom sections, and further include flanges extending into concavities in the constant cross section between different ones of the bottom sections.

23. A furniture construction comprising:

a partition having a horizontally-extending frame member with a plurality of horizontally spaced apertures therein;

a channel with first hooks engaging selected ones of the horizontally spaced apertures, the channel having material defining vertically engagable apertures; and a shelf construction including second hooks attaching to the vertically engagable apertures, thus providing drop-in attachment of the shelf construction to the channel while still providing horizontal adjustability through engagement of the channel with the frame member.

* * * * *

UNITED STATES PATENT AND TRADEMARK OFFICE
CERTIFICATE OF CORRECTION

PATENT NO. : 5,979,118
DATED : November 9, 1999
INVENTORS : Steven C. Gortsema et al.

It is certified that error appears in the above-identified patent and that said Letters Patent is hereby corrected as shown below:

Column 1, line 16;
    "modem" should be --modern--.

Column 2, line 13;
    "moral" should be --morale--.

Column 3, line 27;
    Insert --Fig. 6 is a bottom perspective view of Fig. 5;--.

Column 4, line 32;
    After "are" delete "a".

Column 5, line 25;
    After "pair" insert --of--.

Column 5, line 42;
    "view" should be --views--.

Column 5, lines 43-44;
    "spine wall" should be --spine-wall--.

Column 5, line 54;
    "spine wall" should be --spine-wall--.

Column 7, line 22;
    "includes" should be --include--.

Column 9, line 55;
    "provide" should be --provides--.

UNITED STATES PATENT AND TRADEMARK OFFICE
CERTIFICATE OF CORRECTION

PATENT NO. : 5,979,118
DATED : November 9, 1999
INVENTORS : Steven C. Gortsema et al.

It is certified that error appears in the above-identified patent and that said Letters Patent is hereby corrected as shown below:

Column 10, line 40;
    Delete "also" after "flanges".

Column 10, line 45;
    "place" should be --placed--.

Column 10, line 45;
    "Alternative" should be --Alternatively--.

Column 11, line 61;
    "141 legs" should be --legs 141--.

Column 11, line 65;
    "where-ever" should be --wherever--.

Column 12, line 17;
    Delete "are".

Column 12, line 56;
    "slight" should be --slightly--.

Column 13, line 18;
    "260" should be --360--.

Column 13, line 59;
    After "below" delete "to".

Column 15, line 1;
    "worker" should be --workers--.

UNITED STATES PATENT AND TRADEMARK OFFICE
CERTIFICATE OF CORRECTION

PATENT NO. : 5,979,118
DATED : November 9, 1999
INVENTORS : Steven C. Gortsema et al.

It is certified that error appears in the above-identified patent and that said Letters Patent is hereby corrected as shown below:

Column 15, line 64;
    Before "located" insert --is--.

Column 16, line 10;
    Before "generally" delete "the".

Column 16, line 44;
    "attache" should be --attached--.

Column 17, line 66;
    "partitions" should be --partition--.

Column 19, line 66;
    "it" should be --its--.

Column 20, line 18;
    "engages" should be --engaged--.

Column 20, line 33;
    "spine wall" should be --spine-wall--.

Column 21, claim 5, line 19;
    Delete "112".

Column 21, claim 9, line 33;
    "claim 6" should be --claim 8--.

Column 22, claim 16, line 20;
    "spine wall" should be --spine-wall--.

UNITED STATES PATENT AND TRADEMARK OFFICE
CERTIFICATE OF CORRECTION

PATENT NO. : 5,979,118
DATED : November 9, 1999
INVENTORS : Steven C. Gortsema et al.

It is certified that error appears in the above-identified patent and that said Letters Patent is hereby corrected as shown below:

Column 22, claim 16, line 22;
   "spine wall" should be --spine-wall--.

Column 22, claim 16, line 24;
   "spine wall" should be --spine-wall--.

Column 22, claim 20, line 45;
   "spine wall" should be --spine-wall--.

Signed and Sealed this

Third Day of April, 2001

*Attest:*

NICHOLAS P. GODICI

*Attesting Officer*   Acting Director of the United States Patent and Trademark Office